United States Patent [19]
Matsumura et al.

[11] Patent Number: 5,315,409
[45] Date of Patent: May 24, 1994

[54] METHOD OF AND APPARATUS FOR OBTAINING BINARY IMAGE

[75] Inventors: Akira Matsumura; Ryuji Kitakado, both of Kyoto, Japan

[73] Assignee: Dainippon Screen Mfg. Co., Ltd., Japan

[21] Appl. No.: 838,496

[22] Filed: Feb. 19, 1992

[30] Foreign Application Priority Data
Feb. 19, 1991 [JP] Japan .................. 3-47522

[51] Int. Cl.$^5$ .......................... H01N 1/40; G06K 9/38
[52] U.S. Cl. ............................ 358/458; 358/448; 358/455; 358/465; 382/51
[58] Field of Search ........... 358/448, 455, 456, 458, 358/465, 466; 382/50, 51, 54

[56] References Cited

U.S. PATENT DOCUMENTS

| | | | |
|---|---|---|---|
| 4,468,703 | 8/1984 | Fujiwara et al. | 358/466 |
| 4,491,962 | 1/1985 | Sakou et al. | 382/50 |
| 5,075,872 | 12/1991 | Kumagai | 358/465 |

FOREIGN PATENT DOCUMENTS

| | | |
|---|---|---|
| 0266241 | 5/1988 | European Pat. Off. |
| 3210814 | 11/1982 | Fed. Rep. of Germany |
| 3838032 | 5/1989 | Fed. Rep. of Germany |

Primary Examiner—Edward L. Coles, Sr.
Assistant Examiner—Thomas D. Lee
Attorney, Agent, or Firm—Osterlenk, Faber, Gerb & Soffen

[57] ABSTRACT

A frequency distribution or histogram M ($L_{j-1}$, $L_j$) of differences between gradation levels ($L_{j-1}$, $L_j$) of adjacent pixels ($P_{j-1}$, $P_j$) in an image is obtained, and the number of level-changes for each tentative threshold level $L_j$ is determined as a function of the histogram of the level differencies. By using the number of level-changes, an optimum binarization threshold level is set by means of an adaptive thresholding method. Since the number of level-changes is calculated from the histogram of the level-differencies without practical binarization for each threshold level, the amount of calculations is not dependent on the number of pixels but on the number of gradation levels. The calculations for setting the threshold level for the binarization of the image are achieved at high speeds by a small-scale hardware.

16 Claims, 21 Drawing Sheets

METHOD OF AND APPARATUS FOR OBTAINING BINARY IMAGE

BACKGROUND OF THE INVENTION

1. Field of the Invention

The present invention relates to a method of and an apparatus for obtaining a binary image which can be employed in wiring-pattern inspection of printed circuit boards, for example.

2. Description of the Background Art

In an apparatus for inspecting wiring patterns on printed circuit boards, it is required to discriminate an image of a wiring pattern from a background image. Accordingly, an image signal of the printed board having gradation (hereinafter referred to as "an original image signal") is obtained and is compared with a threshold level to obtain a binary image having logical levels of "0" and "1". The binary image signal thus obtained represents the image of the wiring pattern.

In order to obtain an appropriate binary image of the wiring pattern, the threshold level should be carefully determined. Numerous approaches for determining the threshold level have been proposed, and one of the approaches is the method which is called the "adaptive thresholding method". In this method, an optimum threshold level is determined by analyzing results obtained by binarizing the original image with various threshold levels, respectively, and then selecting one of the various threshold levels according to a predetermined criterion.

However, these conventional methods have a problem in that an enormous processing time is required to binarize the original image with all threshold levels and to calculate and index value for each of the resultant binary images.

To solve the problem, there has been proposed a method of calculating index values at high speeds through filter operations, in which the amount of calculations does not depend on the number of threshold levels. In this method, however, multi-level image memories are required. For high-speed processing, large-scale shift registers should be used as the multi-level image memories, for example, so that the total scale of the hardware therefor is increased.

SUMMARY OF THE INVENTION

The present invention is directed to a method of obtaining a binary image from an original image. The original image represents respective density levels of pixels in the form of gradation levels.

According to the present invention, pairs of gradation levels representing respective pairs of adjacent pixels in the original image are obtained. The number of the pairs of gradation levels are counted for each pair values. The numbers thus counted may be stored in a memory in the form of a matrix.

On the other hand, a tentative threshold level is determined.

Then, the number of pairs of adjacent pixels is obtained, where each pair of adjacent pixels is comprised of such two gradation levels that the tentative threshold level is included in a range defined by the two gradation levels. An index value is determined by the number of pairs of adjacent pixels.

These steps are repeated while updating the tentative threshold value among a plurality of tentative threshold values, to obtain a plurality of index values.

The plurality of index values are compared with each other to determine an optimum threshold value.

The respective gradation levels of pixels in the original image is compared with the threshold value to obtain a binarized image.

According to the present invention, the optimum threshold level can be obtained through obtaining the number of the pairs of gradation levels. The calculations for the number of level-differences for each tentative or trial threshold level are not dependent on the total number of pixels because practical binarization for each tentative threshold level is unnecessary. The amount of calculations for the number of level-differences depends on the number of the plurality of tentative threshold values, which may be the total number of gradation levels representing the original image. The calculations for the number of level-differences can be achieved by a relatively small-scale hardware.

The present invention also provides an apparatus adapted to carry out the present method.

The present invention may be applied to binarization of an original image in an apparatus for inspecting a pattern on a printed circuit board.

Further, the present invention may be applied to an apparatus for converting an image of a drawing on which lines are drawn.

Accordingly, an object of the present invention is to obtain a binary image at high speeds without many steps of practical binarization.

Another object is to reduce dependence on the number of image data in obtaining a binary image.

Further another object is to reduce the required scale of hardware.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Basic Concept

Prior to the detailed description of preferred embodiments according to the present invention, the basic concept of the present invention will be discussed.

In the present invention, changes in gradation level are calculated between each objective pixel and its adjacent pixel, to obtain a histogram or frequency distribution of the changes in gradation level. The changes in gradation level will be hereinafter referred to as "gradation level differences". A plurality of tentative or trial threshold values are determined. The number of pixel-pairs across which the binary level changes from "0" to "1" (or "1" to "0") can be estimated from the histogram for various cases where an objective image signal is binarized with various threshold levels, respectively. This number of pixel-pairs will be referred to as "the number of level-changes". The estimation of "the number of level-changes" does not require actual binarization with the various threshold levels. An optimum threshold level for practical binarization can be determined with reference to the result of the estimation. An actual binarization is conducted only with the optimum threshold level thus determined. The various threshold levels used in the estimation of the number of level-changes is called as "tentative threshold values".

Figure 1:
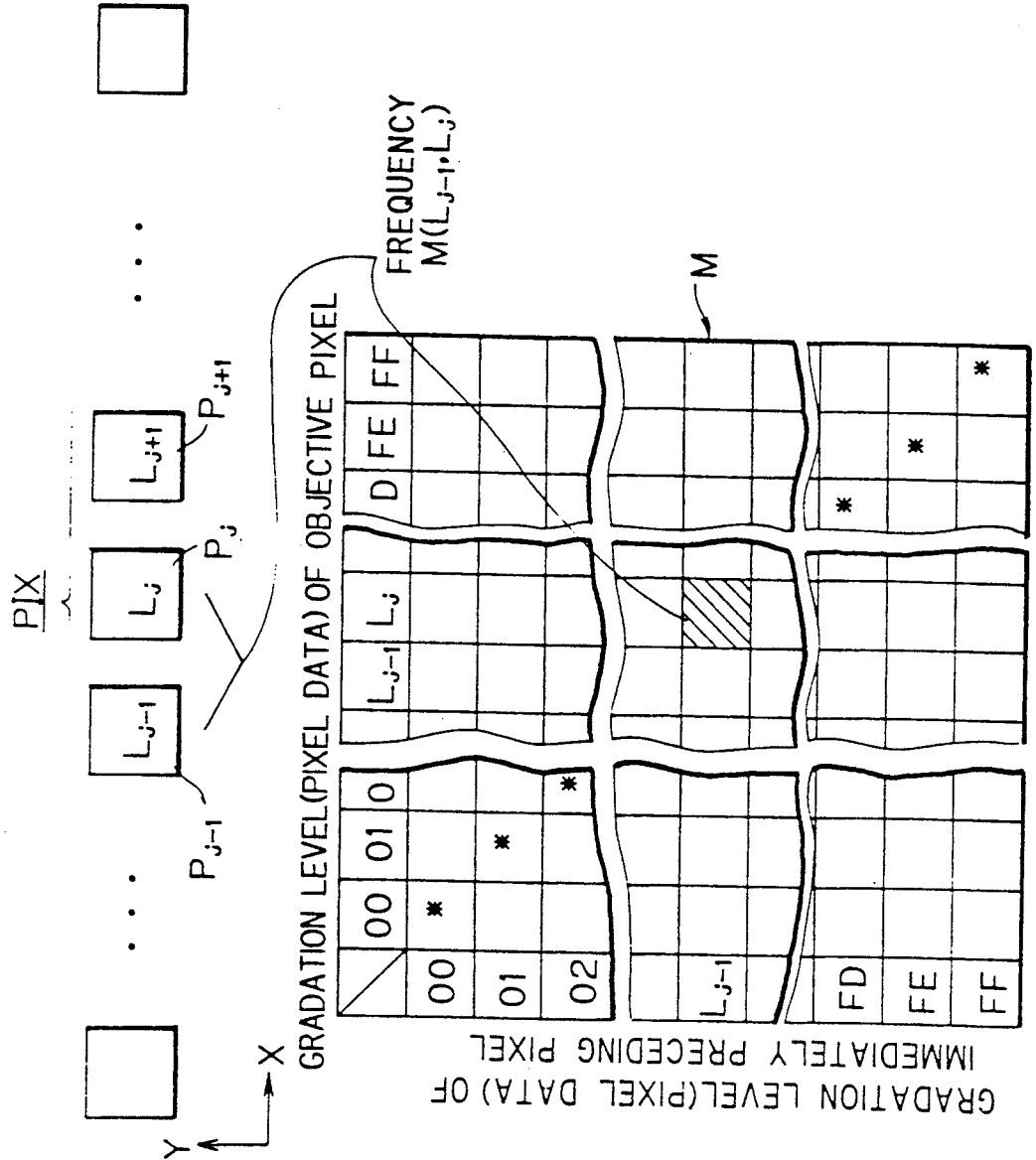
FIGS. 1 to 6 and 9 illustrate a basic concept of the present invention.

FIG. 1 schematically shows these procedures. In the example shown in FIG. 1, an original image, which is an objective image to be binarized by a threshold level TH, is represented by original image signal having eight bits. Thus, the original image is represented by $2^8 = 256$ gradation levels for each pixel. The original image comprised of a two-dimensional array of pixels PIX, and only a part thereof, i.e., a linear array of the pixels PIX arranged in a row in a direction X, are shown in FIG. 1. The direction X may be a main scanning direction in obtaining the original image through scanning of an objective (a printed board, for example). The linear array of pixels PIX includes successive three pixels $P_{j-1}$, $P_j$ and $P_{j+1}$ which are the (j−1)-th, j-th, (j+1)-th pixels from the end pixel on the linear array. The pixels $P_{j-1}$, $P_j$ and $P_{j+1}$ have gradation levels $L_{j-1}$, $L_j$ and $L_{j+1}$, respectively, satisfying the following condition (1):

$$00_H \leq L_{j-1}, L_j, L_{j+1} \leq FF_H \quad (1)$$

where the symbol "H" indicates hexadecimal notation.

The gradation levels of the pixels PIX are fetched along the direction X. The pixel immediately preceding the pixel $P_j$ is a pixel $P_{j-1}$, and the gradation level changes from $L_{j-1}$ to $L_j$ between these adjacent pixels. This change is recorded in a matrix M. The matrix M is comprised of matrix elements defined by an abscissa and an ordinate. The abscissa represents the gradation levels of objective pixels while the ordinate represents the gradation levels of the pixels adjacent to or immediately preceding the respective objective pixels. Respective matrix elements $M(L_i, L_k)$ (not shown) for i, k = 1, 2, 3, ..., are provided for storing values representative of the occurrence frequencies of level-change from $L_i$ to $L_k$, respectively. The record of the change from $L_{j-1}$ to $L_j$ across the adjacent pixels $P_j$ and $P_{j-1}$ is obtained by incrementing the value in the matrix element $M(L_{j-1},$ $L_j)$ by one, which matrix element is the hatched part of FIG. 1. In this manner, the gradation level differences are calculated between all of the pixels and their immediately preceding pixels, and the frequency of the gradation level differences are stored in the matrix M. The matrix M represents the distribution or a histogram of the gradation level differences on a two-dimensional array of elements. The diagonal elements of the matrix M shown with * mark represent the frequency of no level-change in which objective pixels have the same gradation levels as their respective preceding pixels. In the preferred embodiment, these diagonal elements are not used for determining an optimum threshold level.

When the gradation level differences for all of the pixels are obtained, the frequencies of level-changes can be found from the matrix M. For example, the frequency $n_{64,6E}$ (not shown) of the level-changes from the gradation level $64_H$ (decimal numeral 100) to the gradation level $6E_H$ (decimal numeral 110) is found from the values in the corresponding matrix elements in the matrix M.

Consequently, the number of level-changes obtained when the original image signal is binarized with an arbitrary tentative threshold level can be estimated. For example, it is found that the number of level-changes obtained through a tentative threshold level between "101" to "110" is at least $(n_{64,6E} + n_{65,6F})$, where the value $n_{65,6F}$ represents the frequency of changes from the gradation level $65_H$ (decimal numeral 101) to $6F_H$ (decimal numeral 111) and is obtained from the values in the corresponding matrix elements in the matrix M.

Thus the number of level-changes expected to be obtained if the original image is binarized with a tentative threshold value can be estimated by calculating summation of the respective values in the matrix elements corresponding to the level-changes across the tentative threshold value. An optimum threshold level may be determined from the numbers of level-changes for various tentative threshold values. The adaptive thresholding method may be used to select an optimum threshold value while employing the numbers of level-changes as indexes.

Figure 2:
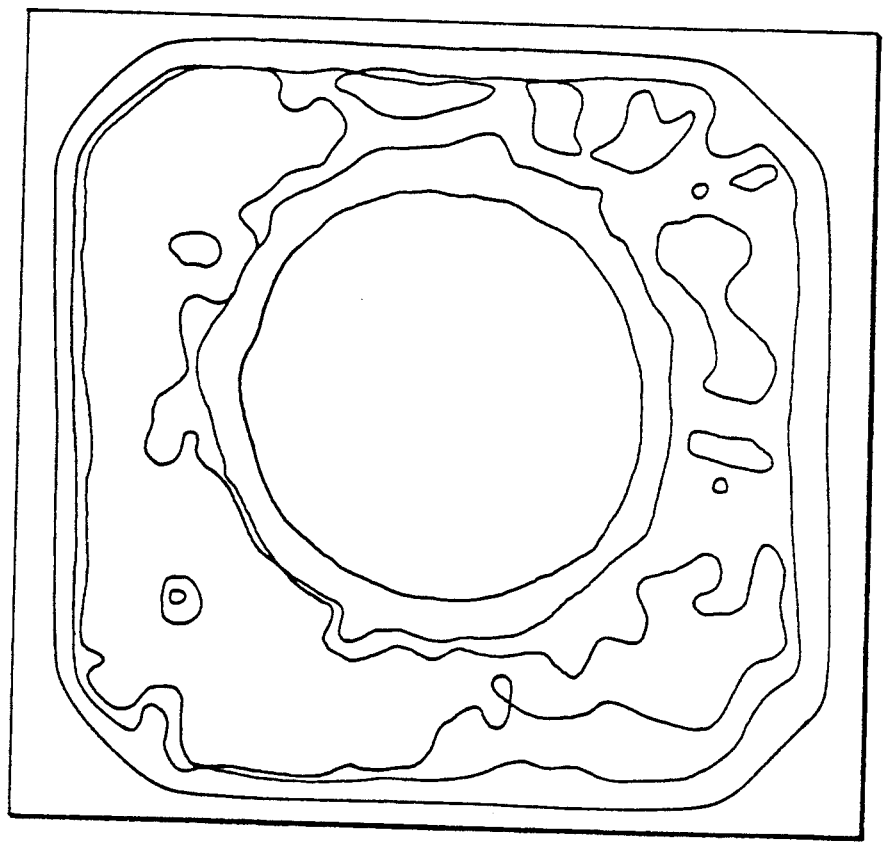
Figure 3:
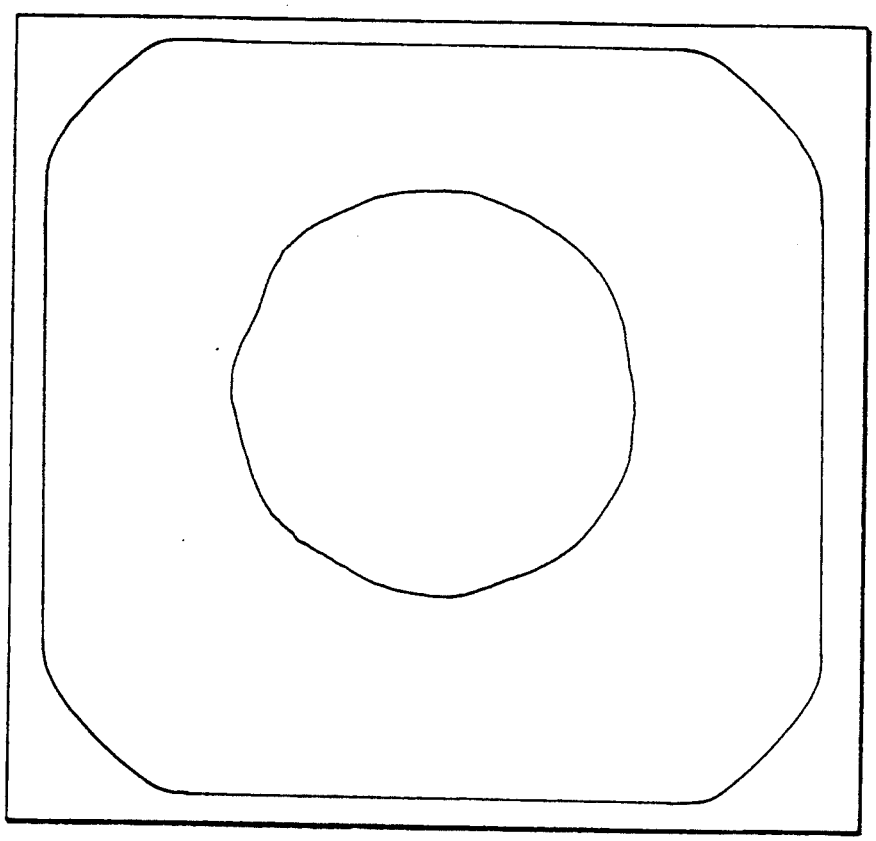
Figure 4:
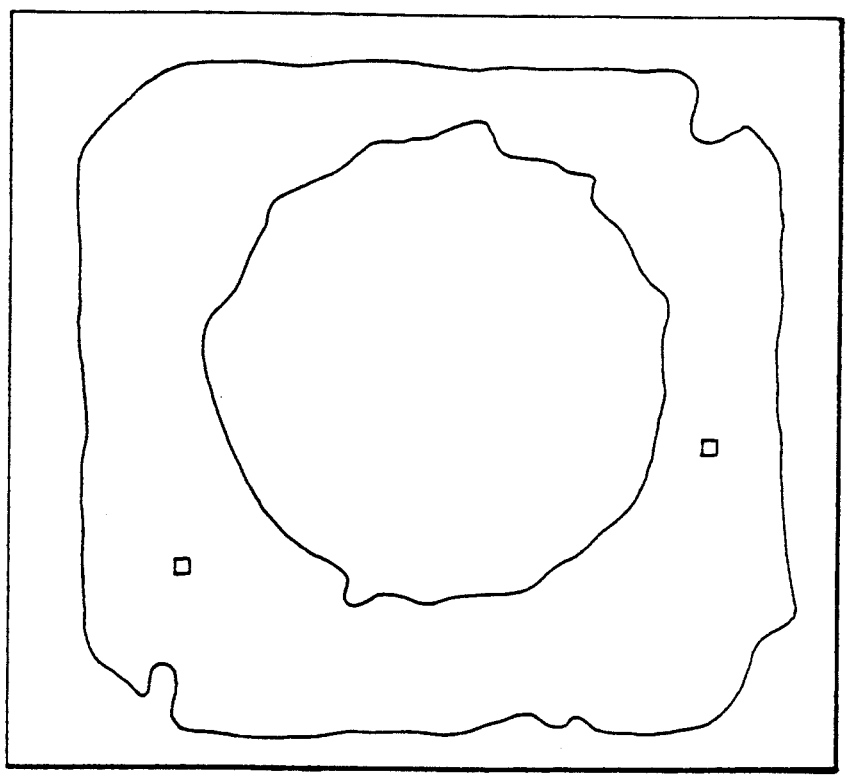
Figure 5:
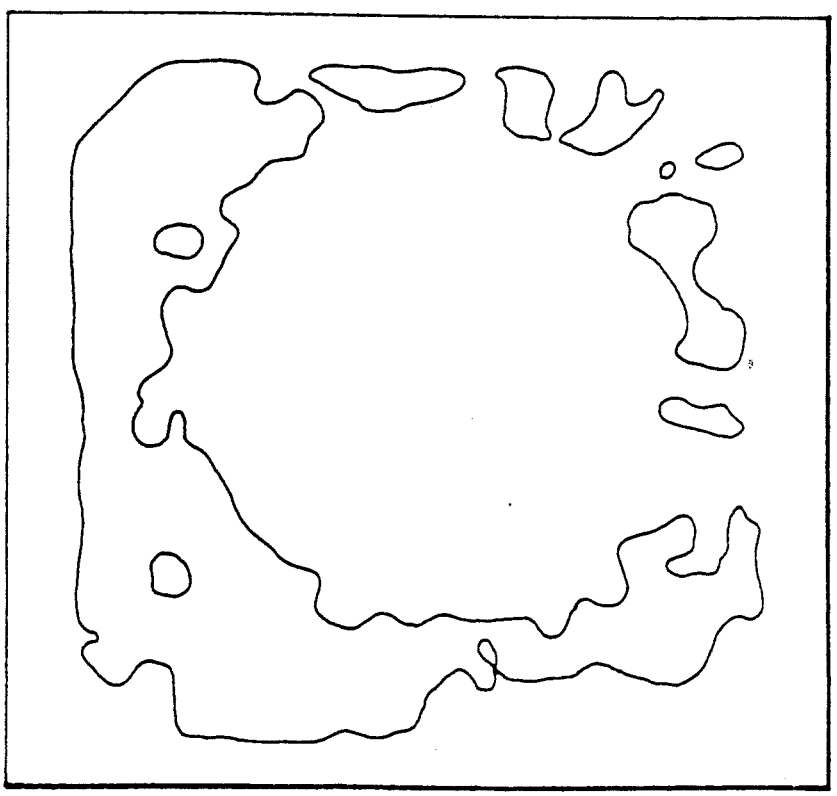

FIGS. 2 to 6 schematically show the concept of determining the optimum threshold level for a wiring pattern of a printed circuit board. The wiring pattern has a land and FIGS. 3 to 5 illustrate the binary images of the land which should be obtained if the original image were binarized with three different threshold levels La, Lb and Lc satisfying the relation:

$$La < Lb < Lc \quad (2)$$

respectively. The FIG. 2 shows the superposition of the three binary images shown in FIGS. 3 to 5, which are equivalent to the contour map of the original image at the three gradation levels corresponding to the three threshold values La, Lb and Lc.

Figure 6:
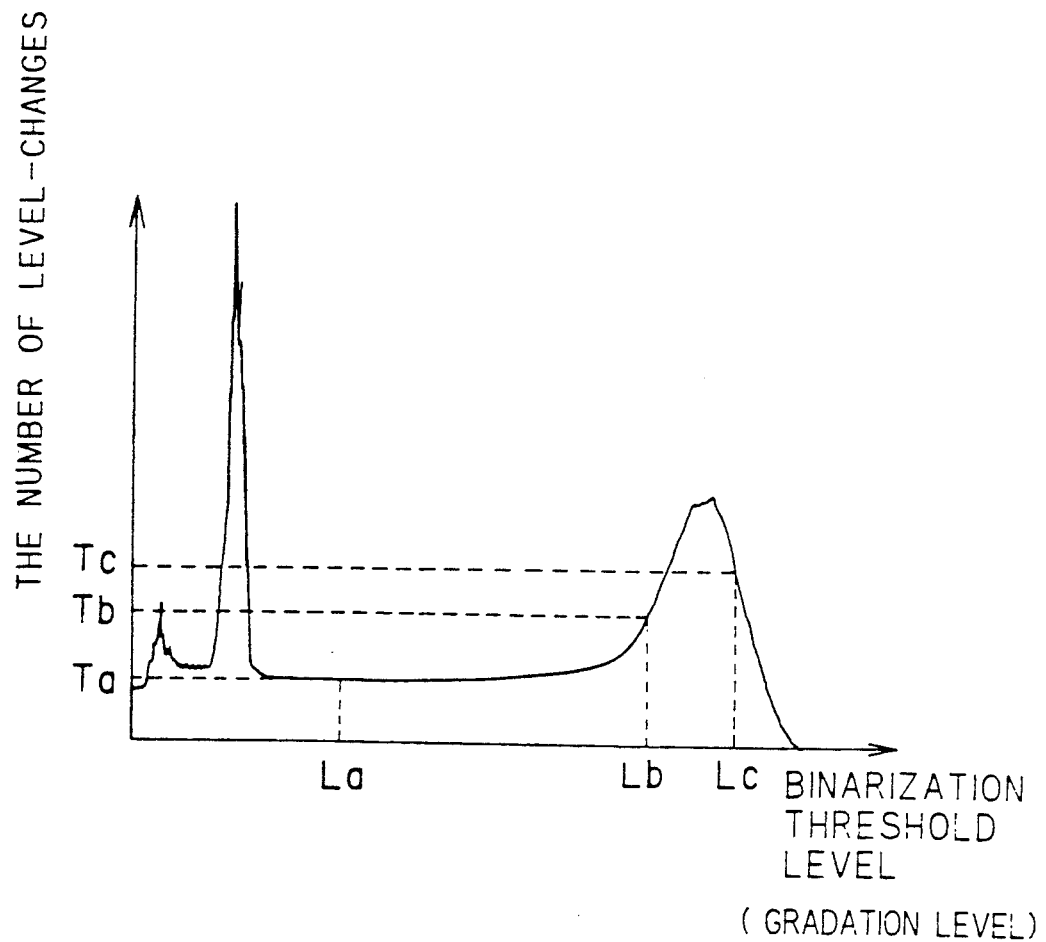

FIG. 6 is a graph showing relation between the threshold levels La, Lb and Lc and the the number of level-changes, in which values for various threshold levels including La, Lb and Lc are plotted. The numbers of level-changes Ta, Tb and Tc correspond to the counter lengths of the counter images of FIGS. 3 to 5, i.e., the run-length compression rates, respectively. It is apparent from FIG. 6 that the number of level-changes is small when a binarization threshold level approximate to La is selected.

Figure 7:
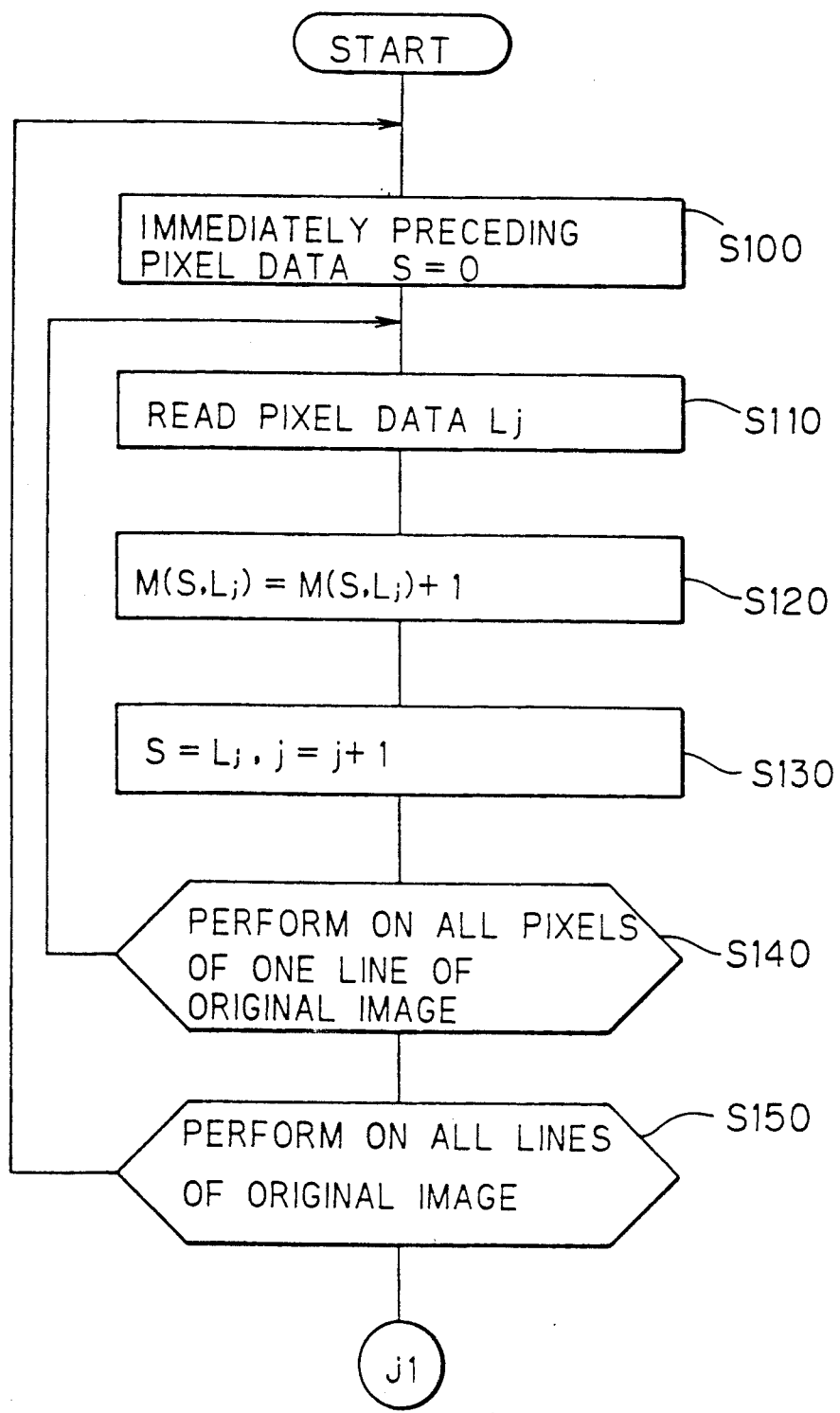
FIGS. 7 and 8 are flow charts of the basic concept of the present invention.
Figure 8:
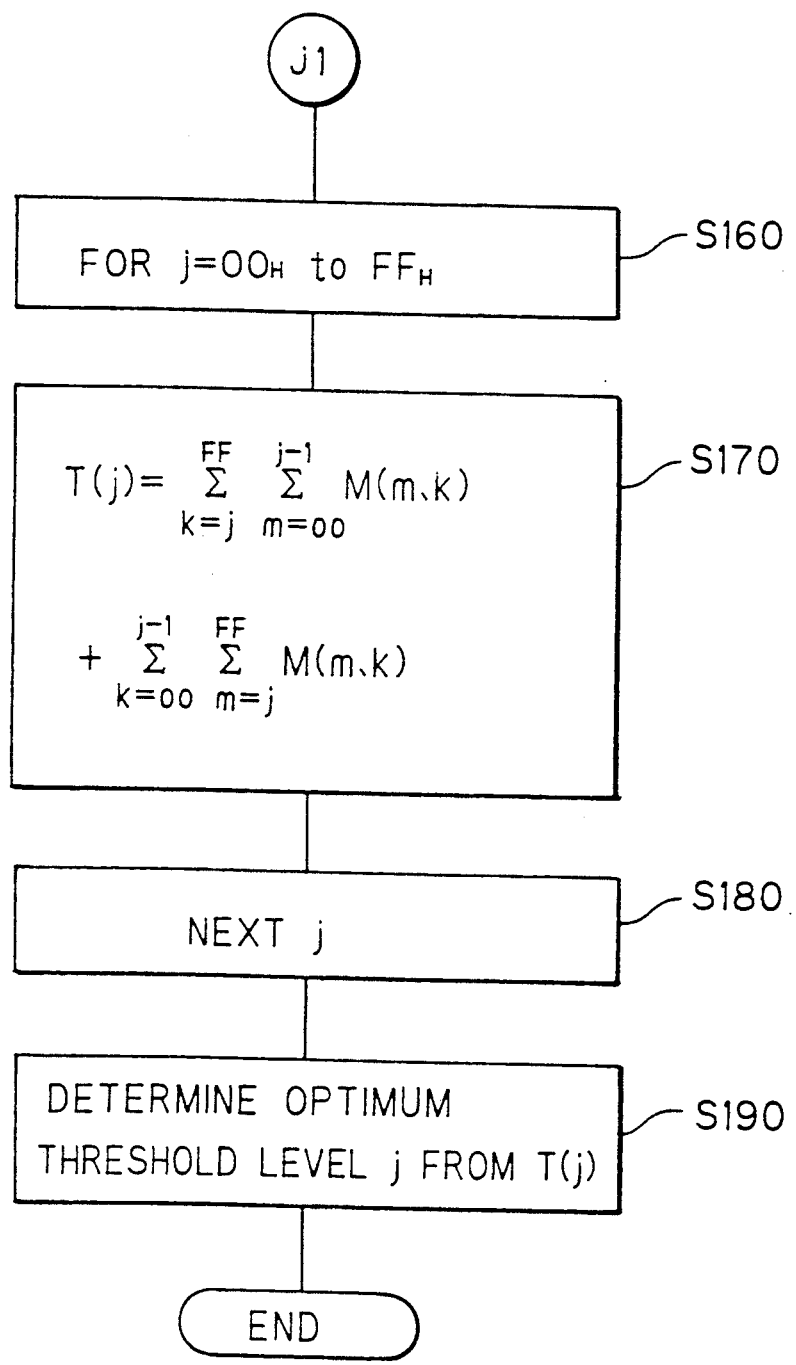

FIGS. 7 and 8 are flow charts showing the procedure of the preferred embodiment of the present invention. Initially, an immediately preceding pixel data S is cleared to zero in the process step S100. The immediately preceding pixel data S is to store the pixel data $L_{j-1}$ which immediately precedes the pixel data $L_j$ representative of the gradation level of the objective pixel. The immediately preceding pixel data S is cleared to zero every time the process reaches the initial pixel of each scanning line running in the main scanning direction of the original image (the direction X). The train of pixels on one scanning line correspond to the pixels PIX shown in FIG. 1.

The pixel data $L_j$ of the objective pixel is read in the process step S110, and the value in the corresponding one element M (S, $L_j$) of the matrix M is incremented by one in the process step S120. That is, the following operation is executed:

$$M(S, L_j) = M(S, L_j) + 1 \tag{3}$$

to add one to the frequency M (S, $L_j$) of the gradation level difference from S to $L_j$ in the matrix M.

For updating the objective pixel along the current scanning line and for examining the gradation level difference between respective pixel data of the new objective and the new immediately preceding pixel, which is the old objective pixel, the following operation is executed:

$$S = L_j, \; j = j + 1 \tag{4}$$

in the process step S130. The process steps S110 to S130 are repeated on all pixels included in the current scanning line of the original image in the process step S140.

After the examination of the gradation level differences in the current scanning line, the process is repeated for the remaining scanning lines along the subscanning direction Y in the process step S150. The elements of the matrix M thus obtained represent the frequencies of the gradation level differences, as above mentioned. Since the number of gradation levels is $2^8 = 256$, the number of elements of the matrix M is $256 \times 256$. However, since the diagonal elements of the matrix M in FIG. 1 are not used, the required number of storage areas in a memory is:

$$256 \times 256 - 256 = 65280 \tag{5}$$

An index value for one tentative threshold level for binarization is determined through the flow chart of FIG. 8. When the gradation level $L_j$ is selected as the tentative threshold level, the number of level-changes expected to be obtained if the original image is binarized with the tentative threshold level $L_j$ is estimated by calculating the sum of:

the frequencies of the changes
from the gradation levels not more than $L_{j-1}$
to the gradation levels not less than $L_j$; and the frequencies of the changes
from the gradation levels not less than $L_j$
to the gradation levels not more than $L_{j-1}$.

Figure 9:
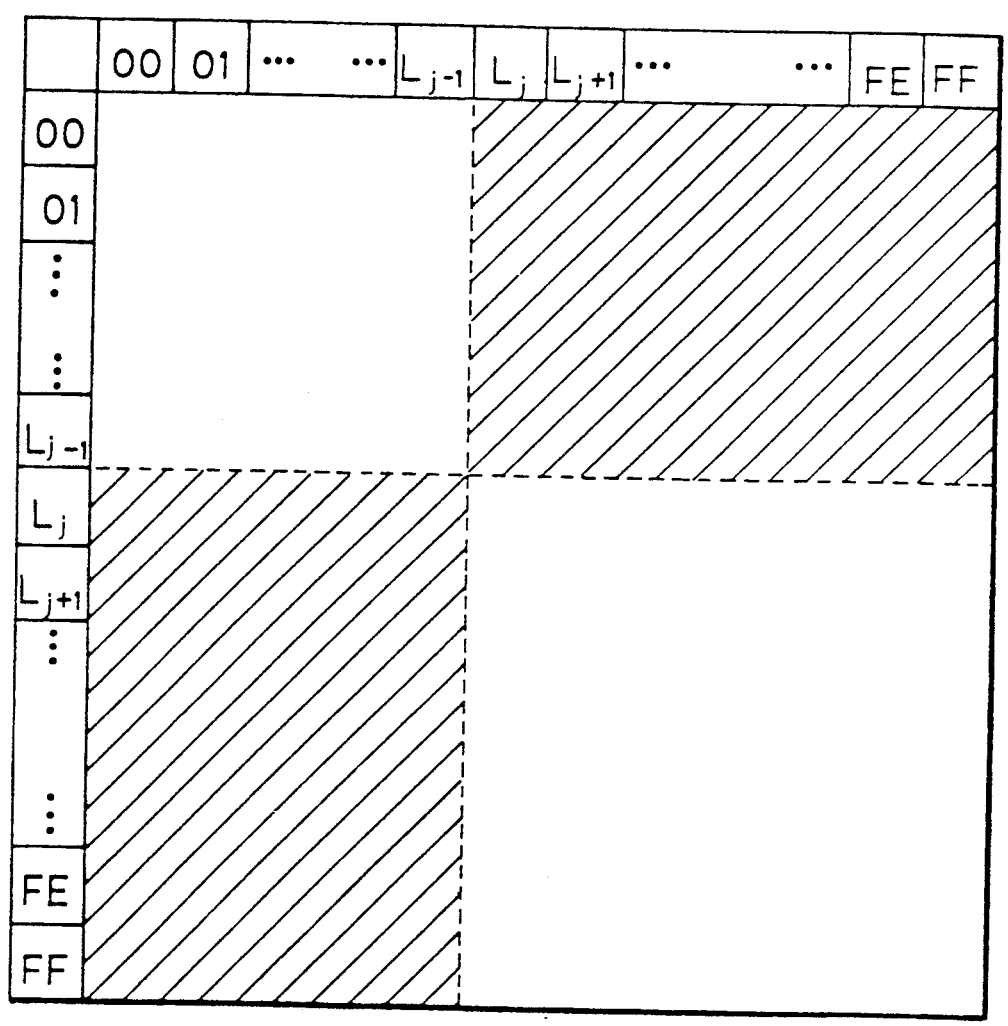

More particularly, this sum of the frequencies are the sum of respective values in the matrix elements of the matrix M shown in FIG. 9 with hatched lines. The sum is calculated in the process step S170 through the following expression (6):

$$T(j) = \sum_{k=j}^{FF} \sum_{m=00}^{j-1} M(m,k) + \sum_{k=00}^{j-1} \sum_{m=j}^{FF} M(m,k) \tag{6}$$

where respective number values are represented in hexadecimal notation.

In the preferred embodiment of the present invention, a plurality of tentative threshold levels are used. Respective tentative threshold levels correspond to the gradation levels used for representing the original image, so that the number of the tentative threshold levels is equal to the number of the gradation levels. Correspondingly, the calculation according to the expression (6) is repeated 256 times (in the process steps S160 to S180). The number of calculations after the determination of the matrix M is not dependent on the number of pixels of the original image, i.e., the number of pixel data is expressed as:

$$2 \times \sum_{j=1}^{n} j(n-j) = (1/3) \cdot n(n-1)(n+1) \tag{7}$$

where n is the number of gradation levels. These calculations are additions, which may be carried out in software as described below or in hardware.

Taking the respective numbers of level-changes T(j) with respect to all of the tentative threshold levels $L_j$ (j=00, 01, 02, ... $FF_H$) as the index values, an optimum threshold level TH for binarization can be determined. The determination may be conducted according to the adaptive thresholding method or another method. For example, a threshold level which minimizes the number of level-changes T(j) is found from the graph as shown in FIG. 6, and the threshold level thus found is employed as the optimum threshold level TH. The minimum of the number of level-changes T(j) may be detected within the range between the first main peak and the last main peak of the graph.

B. Detailed Structure

The detailed structure of a device including an apparatus according to the preferred embodiment of the present invention is as follows:

(B-1) Overall Structure and Operation

Figure 10:
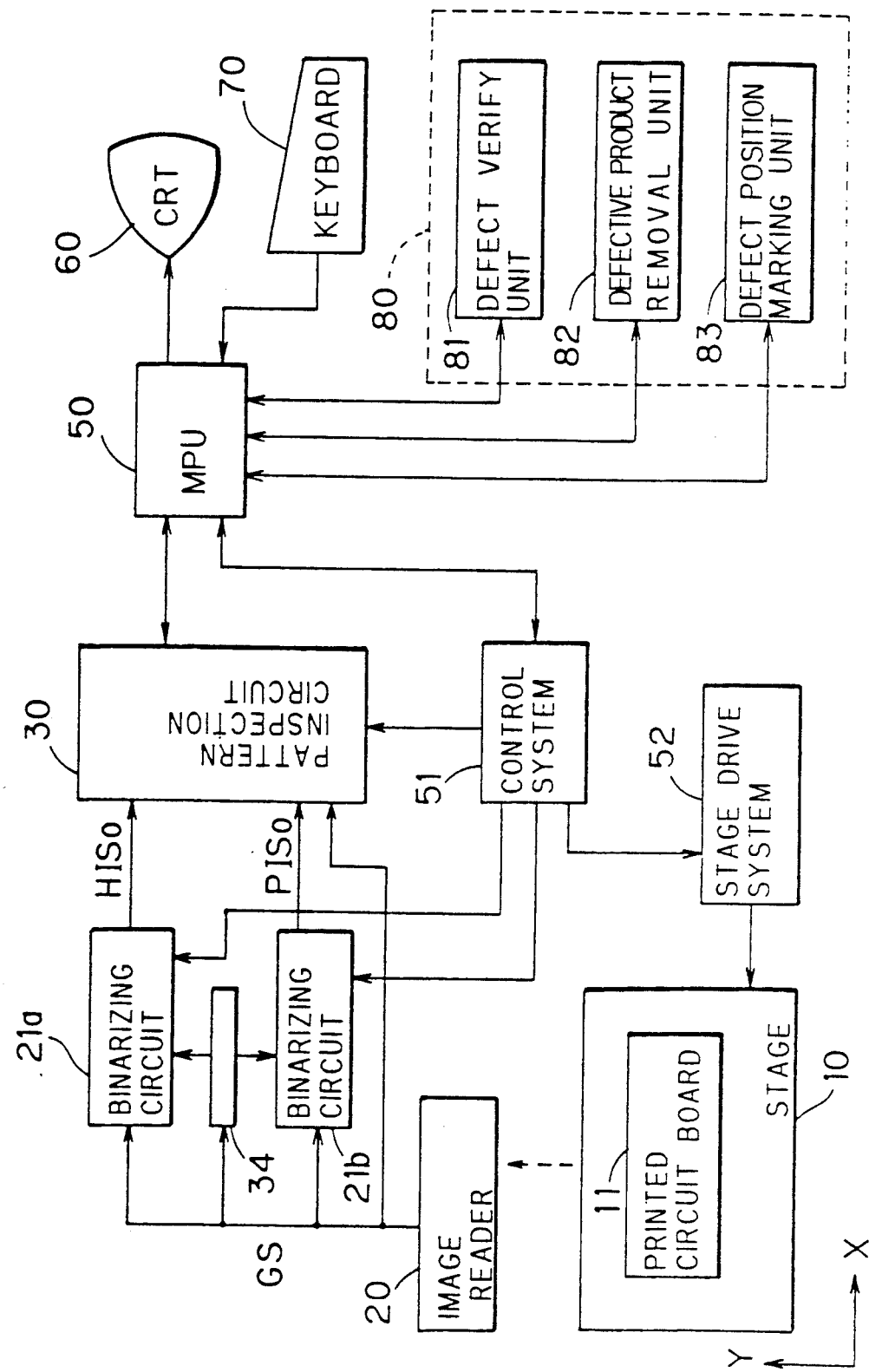
FIG. 10 is a block diagram of a printed circuit board inspection device according to a preferred embodiment of the present invention.

FIG. 10 is a block diagram showing the overall structure of a pattern inspection device for a printed circuit board embodying an apparatus according to the preferred embodiment of the present invention.

An objective printed circuit board 11 to be inspected is disposed on a stage 10. The board 11 is carried in a feed subscanning direction Y while the image thereof is read by an image reader 20 for each scanning line running in a main scanning direction X. The image reader 20 includes a plurality of CCDs arranged in series in the main scanning direction X, each of the CCDs being provided with thousands of CCD elements. The image reader 20 reads a pattern of the board 11 for each pixel to obtain an original image signal GS expressing the image or optical density of the printed board 11 in a predetermined number of gradation levels. The original image signal GS is sent to binarizing circuits 21a and 21b and to a threshold level setting circuit 34 described later. The binarizing circuits 21a and 21b binarize the original image signal GS by binarization threshold levels TH1 and TH2 to produce a hole image original signal $HIS_0$ and a pattern image original signal $PIS_0$, both of which are described later, respectively. Both of the signals HIS$_0$ and PIS$_0$ are inputted to a pattern inspection circuit 30.

The pattern inspection circuit 30, the function of which will be described later, inspects a wiring pattern (including a land) provided on the printed board 11 and relative positional relation between the wiring pattern and a through hole to apply the inspection results to a central processing unit (MPU) 50.

The MPU 50 controls the whole device via a control system 51. The control system 51 produces X-Y addresses for specifying the addresses of data given by the pattern inspection circuit 30, and controls a carrier mechanism of the stage 10 by applying the X-Y addresses to a stage drive system 52. The control system 51 is also adapted to control determination and transmission of the threshold levels TH1 and TH2 for the binarizing circuits 21a and 21b.

On receiving a command from the MPU 50, a CRT 60 displays various calculation results such as a hole image. A keyboard 70 is used for inputting various commands to the MPU 50. An option part 80 comprises a defect verify unit 81, a defective product removal unit 82, a defect position marking unit 83 and the like. The defect verify unit 81 enlargingly displays a detected defect on the CRT 60, for example. The defective product removal unit 82 transports a defective printed circuit board 11, if detected, to a defective product tray and the like. The defect position marking unit 83 puts a mark directly on a defective portion of the printed circuit board 11 or on a point corresponding to the defective portion on a sheet on which the pattern on the printed board 11 is illustrated. These units are optional.

(B-2) Optical Read System

Figure 11:
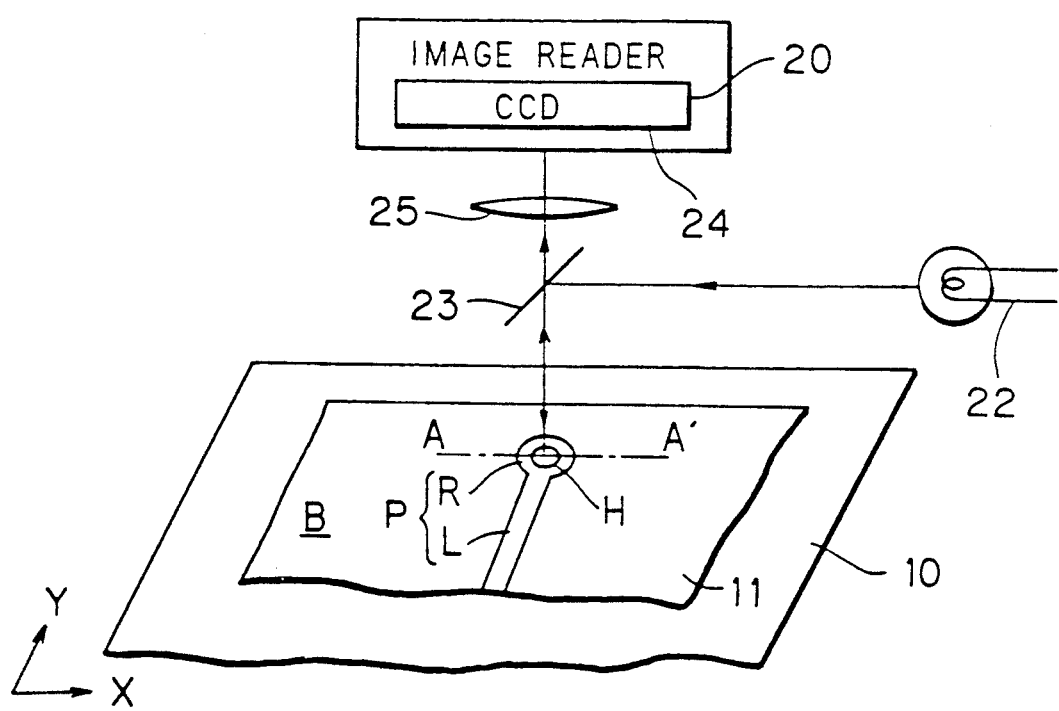
FIGS. 11 and 13 conceptionally show image-reading operations with photoelectric scanning.

FIG. 11 shows an example of optical read systems including the stage 10 and the image reader 20 of FIG. 10.

With reference to FIG. 11, light from a light source 22 is reflected by a half mirror 23 to impinge on the printed circuit board 11 disposed on the stage 10. The printed circuit board 11 is provided with a base plate B a wiring line L, a through hole H and a land R formed around the through hole H. The light reflected by the printed circuit board 11 passes through the half mirror 23 to enter a CCD 24 provided in the image reader 20 through a lens 25. For each scanning line, the CCD 24 reads the light reflected from the base plate B, the wiring line L, the through hole H and land R on the printed circuit board 11 transported in the feed direction Y.

Figure 12:
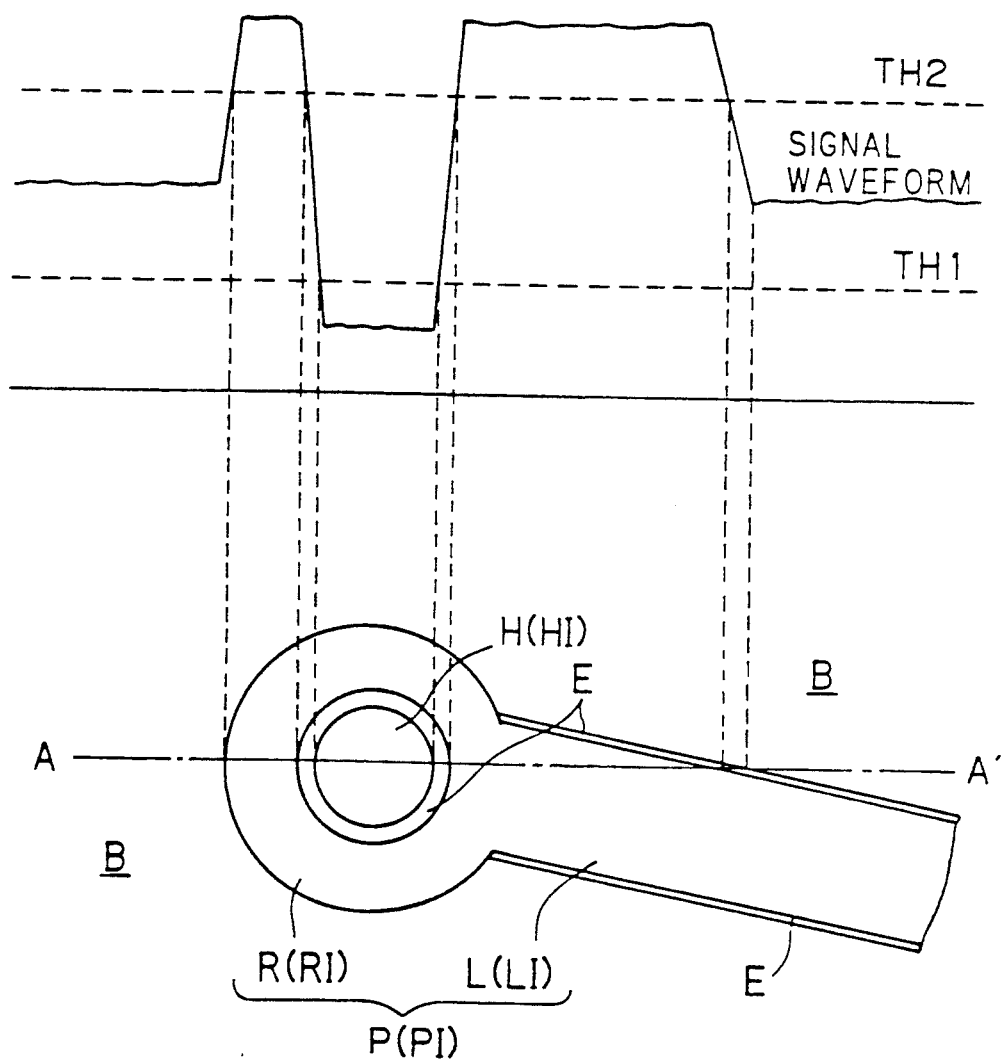
FIG. 12 shows a signal waveform obtained through the image-reading and a pattern obtained therefrom.

FIG. 12 shows a graph of a signal waveform which is read along the line A—A' of FIG. 11 and an example of a pattern obtained by synthesizing the signal waveform for respective scanning lines.

As shown by the signal waveform of FIG. 12, the base plate B reflects a relatively small amount of light, while a wiring pattern P (the line L and land R) made of metal like copper reflects a large amount of light. The through hole H reflects a negligible amount of light. Thus the binarization threshold levels TH1 and TH2 for obtaining respective binary images of the hole H and pattern P are set at the levels of FIG. 12. The values of the threshold levels TH1 and TH2 can be obtained at respective optimum values in the process according to the present invention, as described later. There are usually edge regions E between the through hole H and the land R and between the line L and the base B. The edge regions E have jagged edge parts and inclined surfaces which reflect non-constant amounts of light. The shape of the binary image representing the edge regions E depends on the values of the threshold levels TH1 and TH2, and accordingly, the shapes of respective binary images representing the hole H and pattern P also depend on the values of the threshold levels TH1 and TH2.

The binarizing circuit 21a produces the binary hole image HI representative of the through hole H, and the binarizing circuit 21b produces the binary pattern image PI representative of the wiring pattern P (the line L and land R). The two images HI and PI are used as signals required for inspection of the printed board 11.

Figure 13:
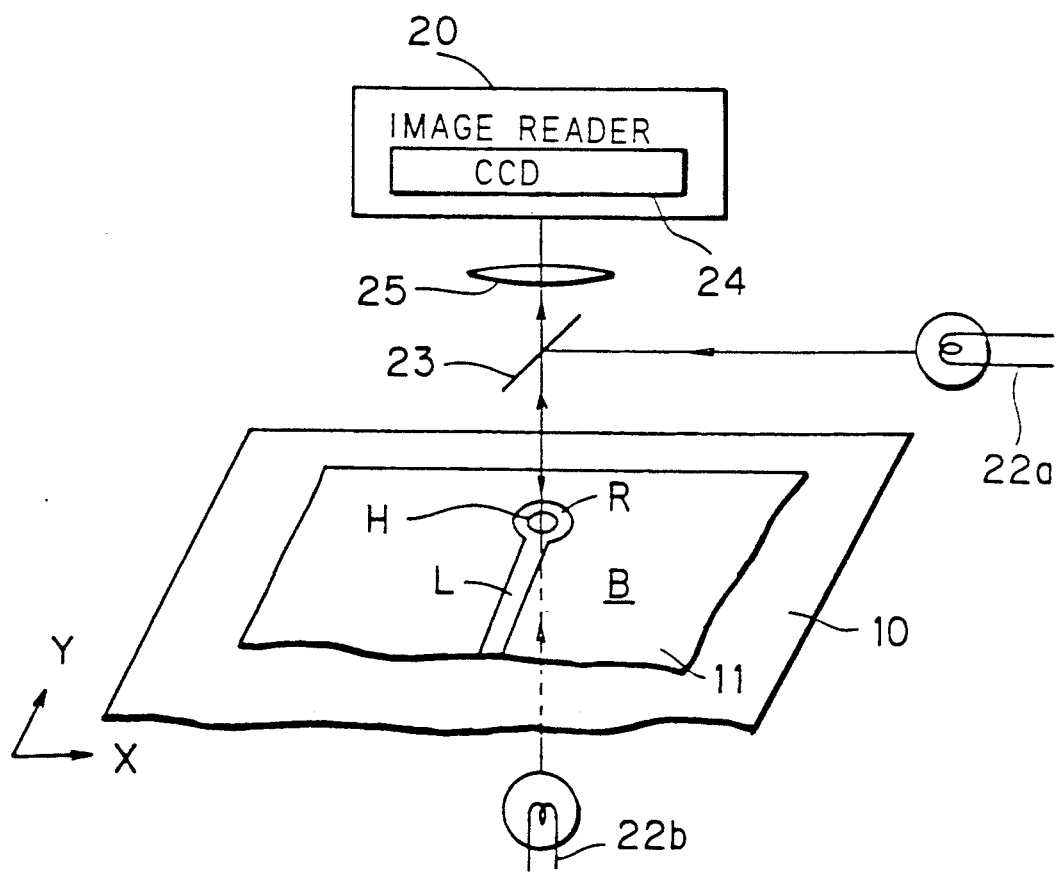

FIG. 13 shows another example of the optical read systems. Light from a light source 22a is directed similarly to the light of FIG. 11, and the light reflected by the printed circuit board 11 impinges on the CCD 24 provided in the image reader 20 through the half mirror 23 and lens 25. In this example, there is provided another light source 22b on the other side of the stage 10. The light which passes through the through hole H also impinges on the CCD 24. Thus the through hole H provides the highest signal level, the wiring pattern P (the line L and land R) provides the medium signal level, and the base plate B and the edge region E provide the relatively low signal level.

Still another example of the optical read systems may be constructed such that two or more trains of CCDs 24 detect the wiring pattern P (the line L and land R) by means of the light source 22a and detect only the through hole H by means of the light source 22b to output the resultant data separately to the binarizing circuits.

(B-3) Pattern Inspection Circuit

Figure 14:
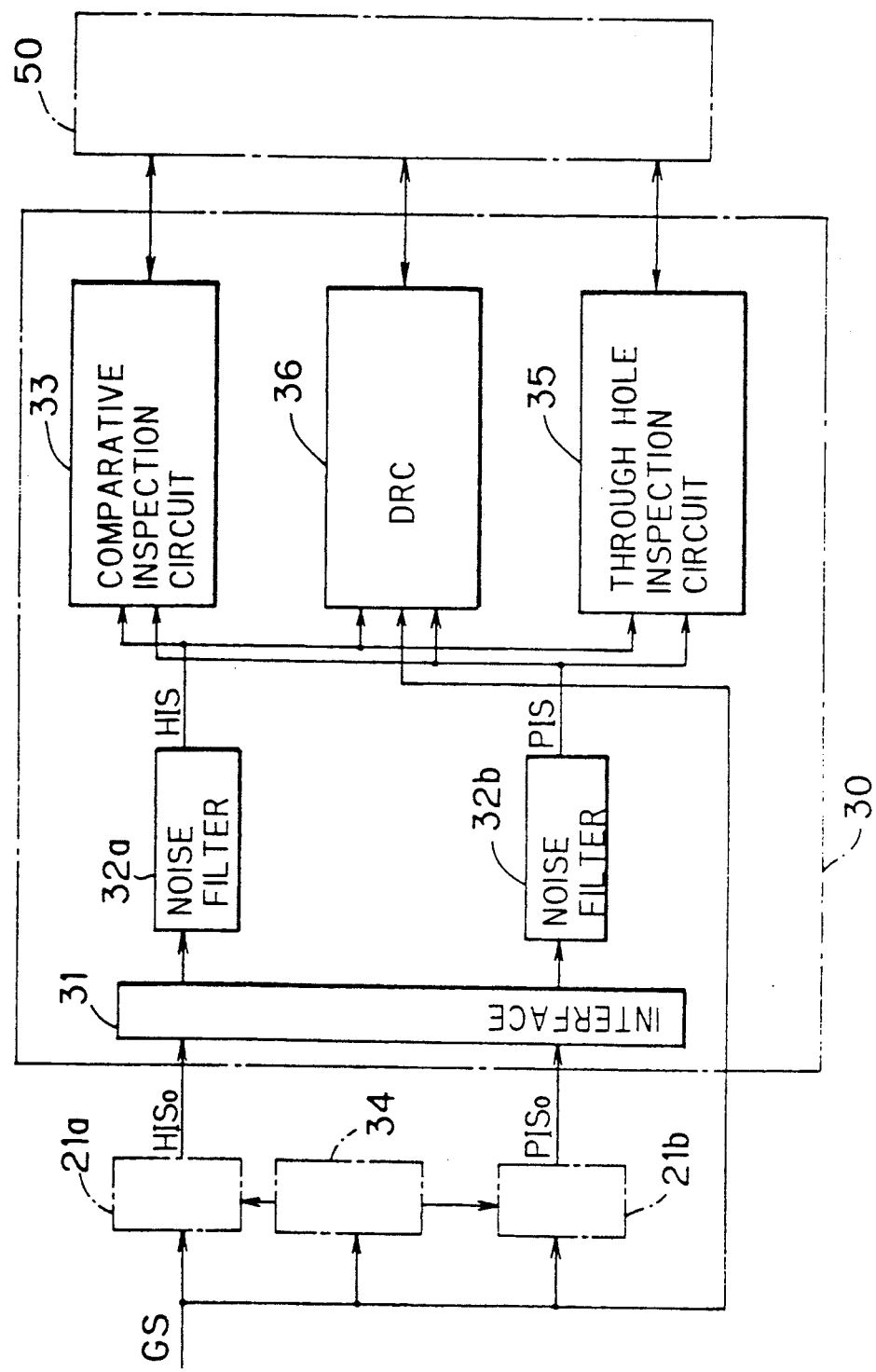
FIG. 14 is a block diagram of a pattern inspection circuit.

FIG. 14 is a block diagram of the pattern inspection circuit 30 shown in FIG. 10.

The hole image original signal HIS$_0$ and pattern image original signal PIS$_0$ which are produced in the binarizing circuits 21a and 21b of FIG. 10 are applied respectively to noise fileters 32a and 32b through an interface 31 in FIG. 14. The noise filters 32a and 32b remove noise by a smoothing processing and the like to produce a hole image signal HIS and a pattern image signal PIS, respectively.

Both of the signals HIS and PIS are applied to three circuits: a comparative inspection circuit 33; a DRC (design rule check) circuit 36; and a through hole inspection circuit 35.

The comparative inspection circuit 33 compares and collates the hole image signal HIS and pattern image signal PIS with an image signal obtained from a reference printed circuit board prepared in advance, to specify a difference therebetween as a defect. The reference printed circuit board is of the same type as the objective printed circuit board 11 and be judged as undefective in advance.

The through hole inspection circuit 35 detects the relative positional relation between the land R and the hole H on the printed circuit board 11, to inspect the defectiveness of the printed circuit board 11 by judging whether or not the relation deviates from designed values.

The DRC circuit 36 judges whether or not the objective printed circuit board 11 deviates from characteristics of an undefective sample board, e.g., conditions of line widths, angles, continuity.

(B-4) Threshold Level Setting Circuit

Figure 15:
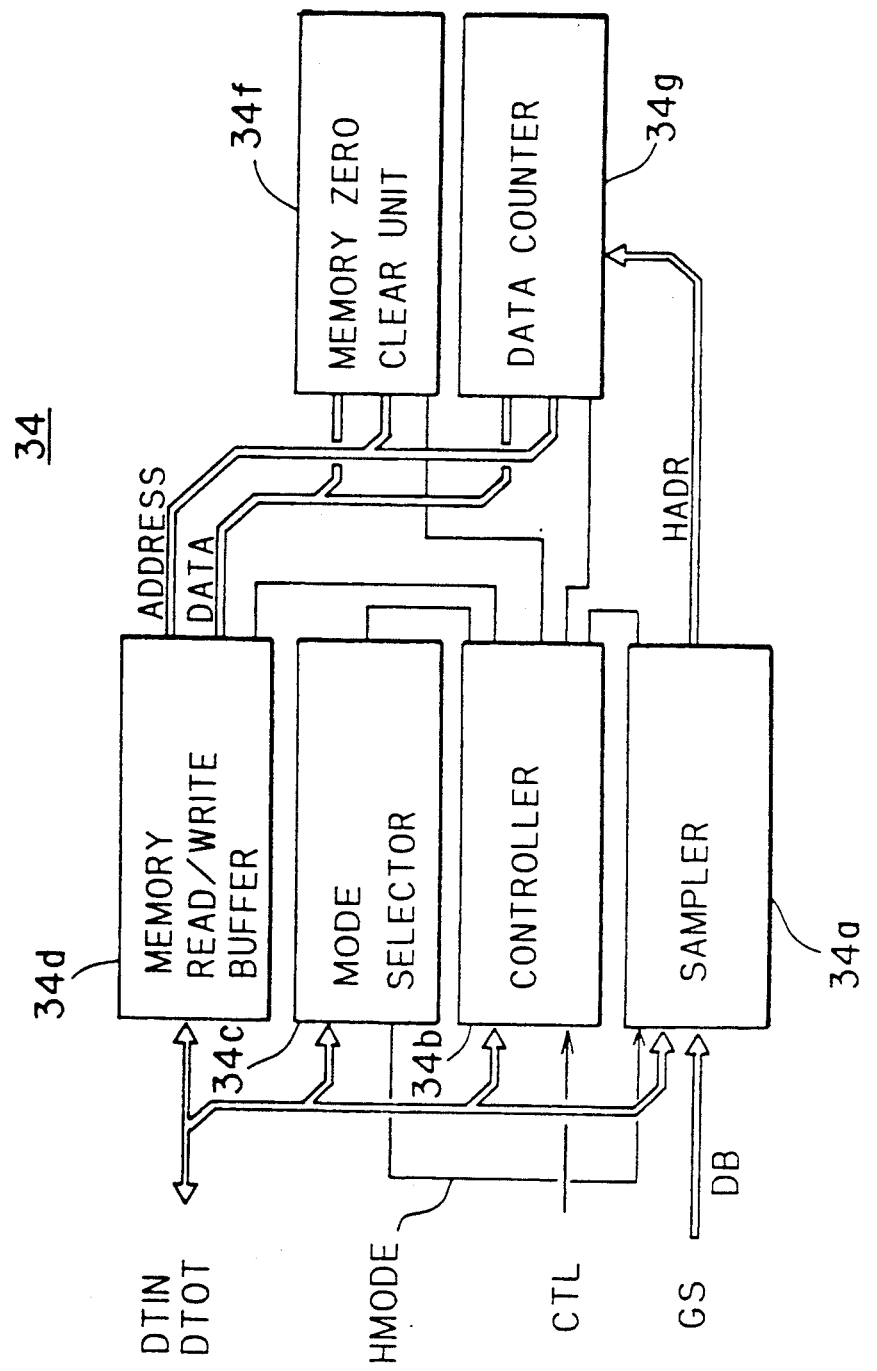
FIG. 15 is a block diagram of a threshold level setting circuit.

FIG. 15 is a schematic block diagram of the threshold level setting circuit 34. The details of the circuit 34 will be discussed later in relation to respective components thereof, and the detailed description of clocks and the like is omitted in FIG. 15.

A sampler 34a, on receiving the original image signal GS through a data bus DB, generates a signal representing the gradation level differences in the form of a memory address HADR to a data counter 34g. The data counter 34g is equipped with memories for storing the matrix (histogram or frequency distribution) M and counts the frequency m (S, $L_j$) at the memory addresses HADR corresponding to the gradation level differences. A memory zero clear unit 34f and the data counter 34g are connected to a memory read/write buffer 34d by an address bus and a data bus. The buffer 34d functions to read out the matrix M from the data counter 34g.

A mode selector 34c outputs a mode selection signal HMODE for selecting either execution of the process shown in FIGS. 7 and 8 or production of a reflectance histogram.

A controller 34b controls the sampler 34a, data counter 34g, memory zero clear unit 34f, memory read/write buffer 34d, and mode selector 34c. A control signal CTL from the MPU 50 controls the controller 34b.

The memory read/write buffer 34d, mode selector 34c, controller 34b and sampler 34a are connected to a system input bus DTIN. By using the matrix M connected to the input bus DTIN, the MPU 50 executes the calculations under software control in conformity with the flow chart of FIG. 8.

The detailed operations of the respective components of the threshold level setting circuit 34 will be described below.

(B-5) Sampler

Figure 16:
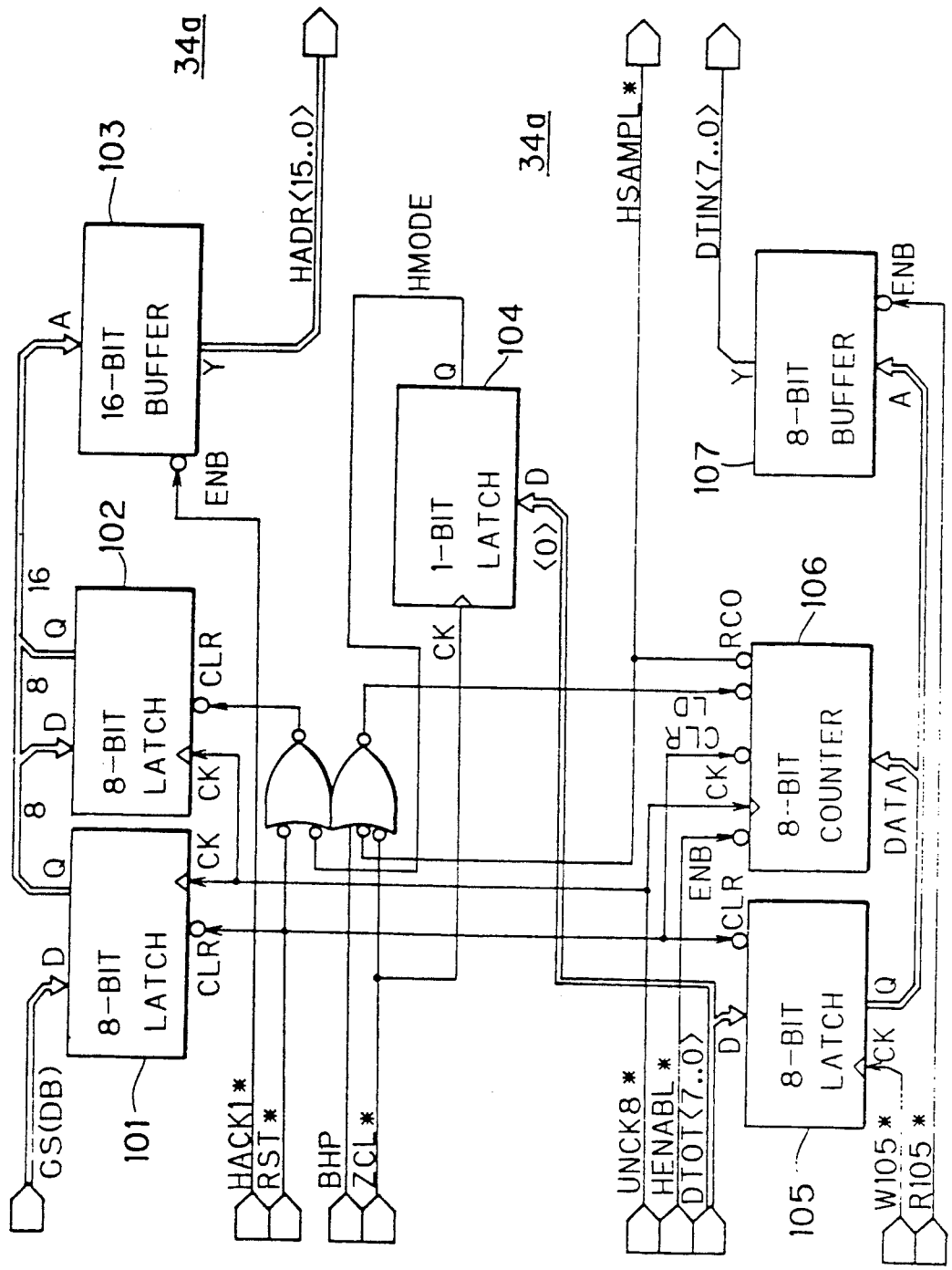
FIG. 16 is a circuit diagram of a sampler.

FIG. 16 is a circuit diagram of the sampler 34a.

An 8-bit latch 102 is a register for storing the immediately preceding data S. A clear terminal CLR of the latch 102 is operated by a power source reset signal RST* and by the mode selection signal HMODE described later. The "*" mark refers to a negative logic hereinafter. The original image signal GS is forced to zero before each scanning line scanning, and therefore, the zero clear of the immediately preceding data S in the process step S100 of FIG. 7 using the clear terminal CLR is required only for pixels other than the respective first pixel in each scanning line.

The operation in the process step S110 is equivalent to the input of the original image signal GS for one pixel through the data bus DB to an 8-bit latch 101 in the hardware, the original image signal GS having gradation levels the number of which is:

$$256 = 16^2 = 2^8 \qquad (8)$$

A basic clock UNCK8* controls the timing of this input at a clock terminal CK of the latch 101.

Since the basic clock UNCK8* also controls the timing of the latch 102 at a clock terminal CK of the latch 102, the content of the latch 101 is fed to the latch 102 each time the original image signal GS for one pixel, i.e, 8 bits is inputted to the latch 101. This corresponds to the operations in the process steps S110 and S130 of FIG. 7. Thus the latch 101 stores the j-th pixel data $L_j$, and the latch 102 stores the immediately preceding pixel data S, the (j−1)-th pixel data $L_{j-1}$. The pixel data of the adjacent pixels stored in the latches 101 and 102 are sent to a 16-bit buffer 103 in the form of a data of 8 bits+8 bits=16 bits. When a control signal HACK1* described later triggers a control input ENB of the buffer 103, the respective pixel data corresponding to the adjacent pixels, from which the gradation level difference is to be obtained, is outputted from the buffer 103 in the form of the memory address HADR. In FIG. 16, the symbol "<15..0>" indicates that the signal has 16 bits of the zeroth to fifteenth. The row S and column $L_j$ of the matrix M of FIG. 1 to be sent to the data counter 34g are specified by the memory address HADR.

An 8-bit counter 106 is operable to hold a predetermined sampling interval, to thereby prevent the data-to-be-counted from overflowing from the memory 202 (the matrix M) when a wide area having a large number of pixels is designated on the original image. Specifically, under the condition that a data enabling signal HENABL* triggers a control input ENB of the counter 106, the counter 106 counts down from an initial value in accordance with the basic clock UNCK8*. On counting down to "zero", the counter 106 outputs a count enabling signal HSAMPL* from a ripple carry out terminal RCO thereof to the data counter 34g.

The initial value is inputted from the MPU 50 via a system output bus DTOT and an 8-bit latch 105 to an input terminal DATA of the counter 106. A write signal W105* controls the timing at which the latch 105 receives the initial value. A load terminal LD of the counter 106 controls the timing at which the counter 106 receives the initial value. That is, the counter 106 receives the initial value when it is indicated that the one-line scanning is completed with a black hold pulse BHP, when it is indicated that the memory is cleared to zero with a memory zero clear signal ZCL*, and when the count enabling signal HSAMPL* is outputted. These signals permit a cyclic count processing. The initial value is inputted on the system input bus DTIN via an 8-bit buffer 107 in response to a read signal R105* of the latch 105.

The power source reset signal RST* clears the latch 105 and counter 106 to zero as well as the latch 101.

If the content of the latch 102 is always held at zero, on the other hand, the lower eight bits of the memory address HADR express the gradation level itself of the original image signal GS transmitted one after another. This enables the data counter 34g to produce the normal reflectance histogram indicating the number of pixels which have the gradation level $L_j$. In other words, the circuit of FIG. 16 may be obtained by adding the latch 102 and related connections to a conventional reflectance histogram generator. In this preferred embodiment, the mode selection signal HMODE is produced to control the zero clear of the latch 102 together with the power source reset signal RST*, as above described. The mode selection signal HMODE is continuously outputted from a 1-bit latch 104 triggered by the memory zero clear signal ZCL*.

(B-6) Data Counter

Figure 17:
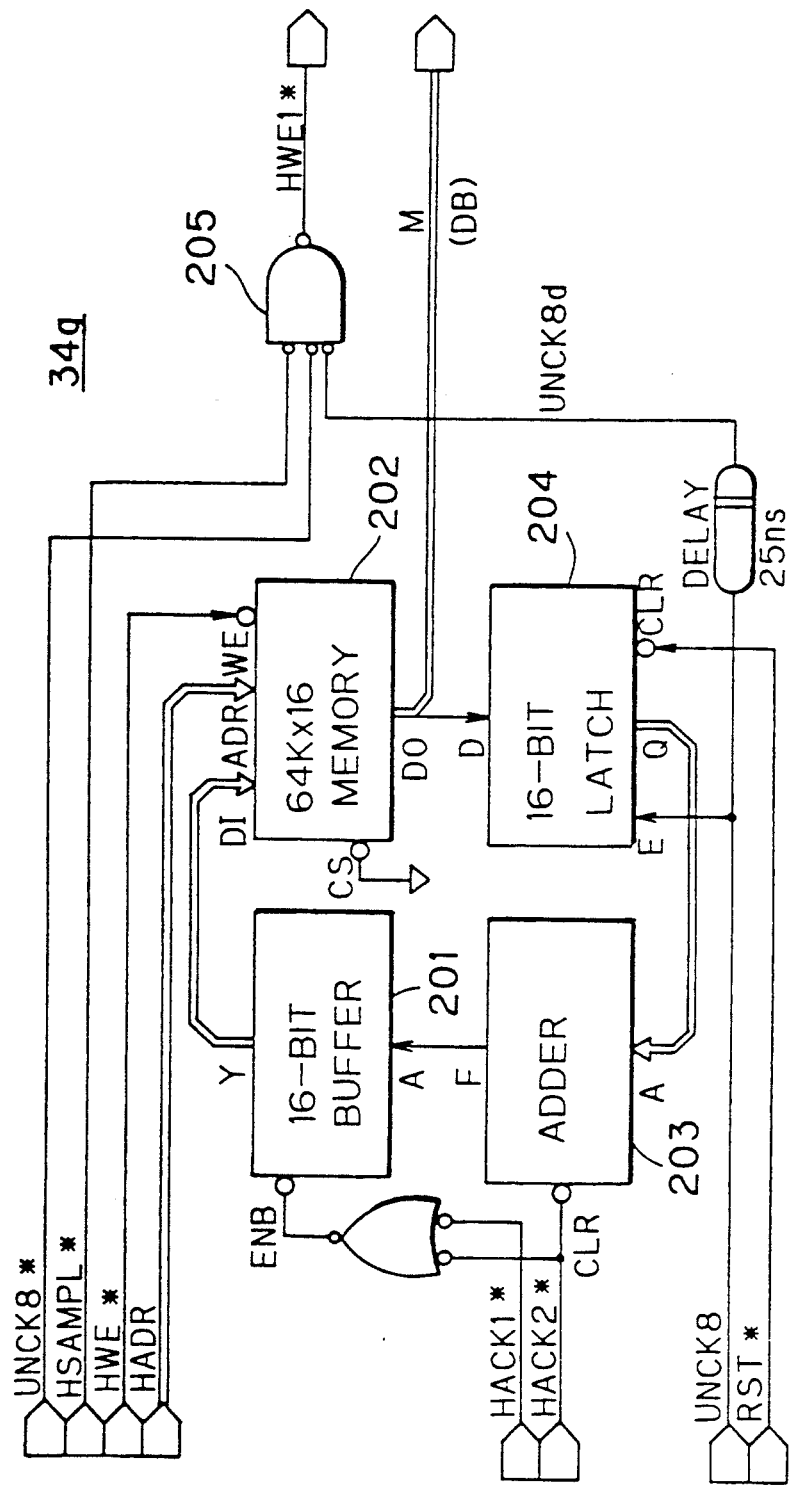
FIG. 17 is a circuit diagram of a data counter.

FIG. 17 is a circuit diagram of the data counter 34g. A 16-bit buffer 201 holds the new content of the specified memory address HADR in a memory 202, and a 16-bit latch 204 holds the old content thereof. The operation corresponding to the process step S120 of FIG. 7 will be described below.

The address HADR of 16 bits which is produced by the sampler 34a specifies the address of the memory 202 of 64 K words, where each word is 16 bits. A memory write signal HWE* is inputted to a write enabling terminal WE of the memory 202, whereby the data value of the frequency M (S, $L_j$) stored in the corresponding matrix element is read out from the memory 202 and is sent to the 16-bit latch 204. The latch 204, which is a transparent latch, transmits the data value from the memory 202 to an adder 203 at the timing controlled by the basic clock UNCK8.

Since the transmission of the memory address HADR to the data counter 34g indicates detection of a change in gradation level from S to $L_j$, one is added to the data in the adder 203, where S is the upper eight bits of the address HADR and $L_j$ is the lower eight bits of the address HADR. The data obtained by the addition to be newly stored in the memory 202 as the data in the memory address HADR is once stored in the 16-bit buffer 201 and waits for the timing to be inputted to the memory 202.

Control signals HACK1* and HACK2* control the timing at which the new data is inputted to the memory 202. The control signal HACK1* permits the access to the data counter 34g and controls the 16-bit buffer 103 in the sampler 34a, as described in Section (B-5). Thus the timing of the process step S120 is controlled by the control signal HACK1*.

The control signal HACK2* permits the zero clear of the memory. Independently of the content of the memory 202, the adder 203 constantly outputs "zero" by the control signal HACK2* inputted to the clear terminal CLR. This "zero" is sent to an input terminal DI of the memory 202 by way of the 16-bit buffer 201 at the timing of the control signal HACK2*. At this time, the data of the memory address HADR is rewritten to "zero".

The data to be newly stored in the memory 202 is inputted to the input terminal DI of the memory 202 at the foregoing timing. When the control signal HACK1* is in an active level, the content of the address HADR of the memory 202 is rewritten to the data to which one is added.

For adjustment of a required processing speed in the adder 203 and an access time of the memory 202, there are provided basic clocks UNCK8 and UNCK8* which have complementary phases and a delay device DELAY, as will be described below.

The memory write signal HWE*, which is described later in relation to the controller 34b, is produced based on a counter write signal HWE1* which is produced by a gate 205 included in the data counter 34g itself.

Figure 18:
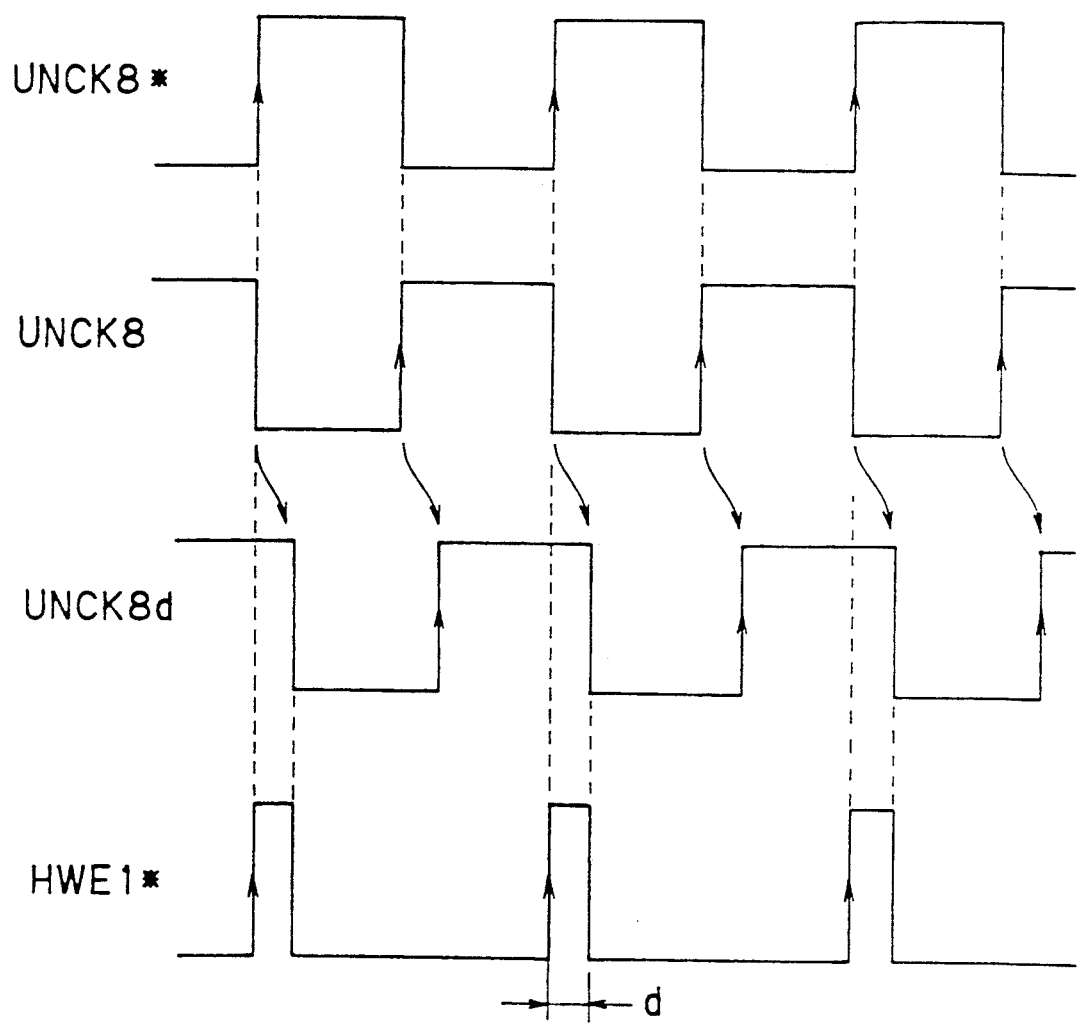
FIG. 18 is a waveform chart showing the production of a memory write signal.

When the count enabling signal HSAMPL* from the sampler 34a is a state permitting the gate 205 being opened, the counter write signal HWE1* is the logical product of the basic clock UNCK8* and a basic clock UNCK8d delayed by the delay device DELAY. There is shown in FIG. 18 phase relation between these signals. The counter write signal HWE1* is a pulse having a width of delay amount d of the delay device DELAY.

The logical product of the write signal HWE1* and the control signal HACK1* is obtained in the controller 34b to generate the memory write signal HWE*. As far as the control signal HACK1* permits the access to the data counter 34g, the memory 202 is rewritten in response to trigger by the pulse having the width d.

The data bus DB is connected to an output terminal DO of the memory 202. The content of the matrix M is put on the data bus DB after the production of the frequencies of the level differences.

(B-7) Memory Read/Write Buffer

Figure 19:
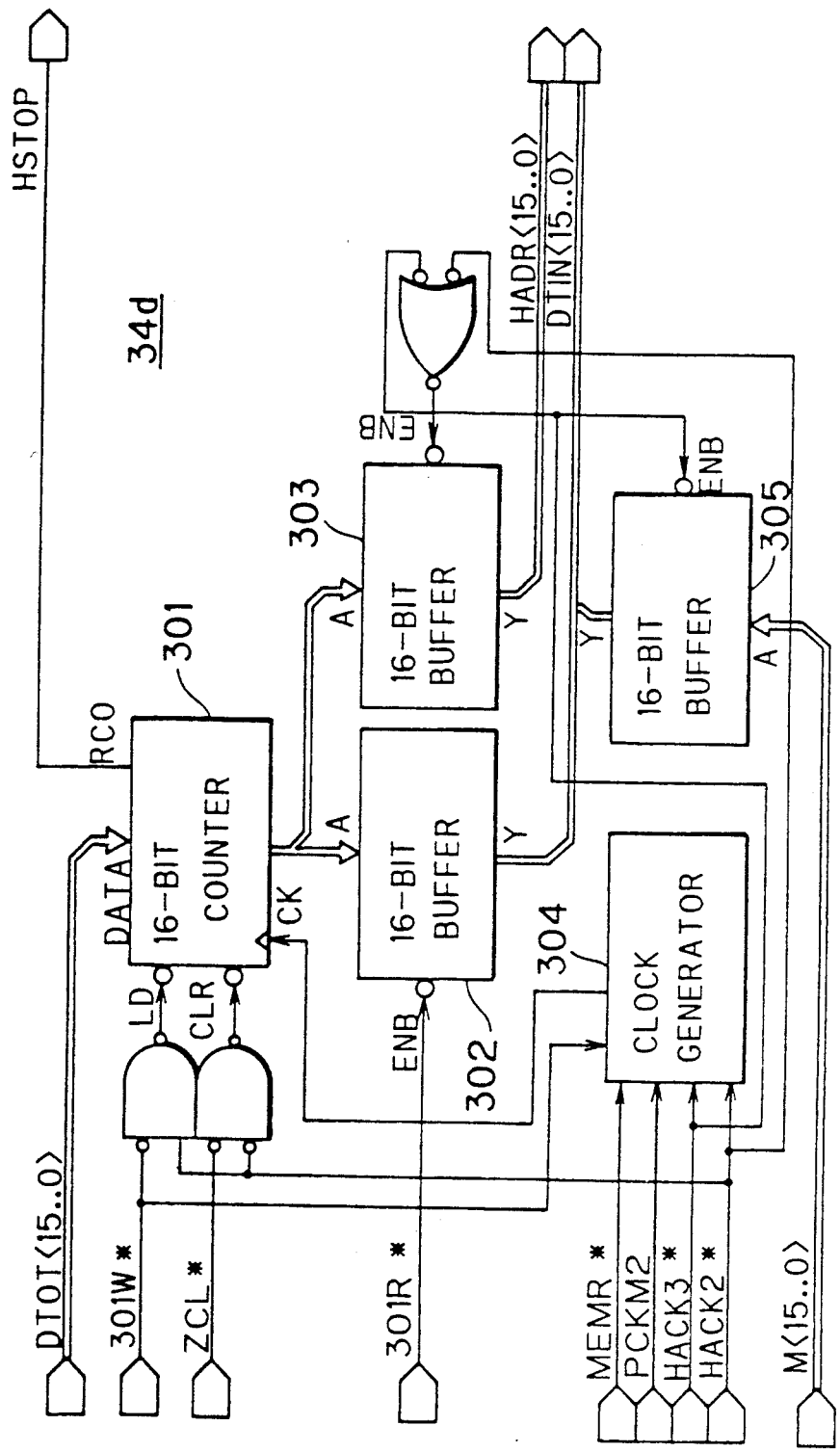
FIG. 19 is a circuit diagram of a memory read/write buffer.

FIG. 19 is a circuit diagram of the memory read/write buffer 34d. The output of a 16-bit counter 301 is inputted to 16-bit buffers 302 and 303. The buffer 302 outputs the address specified by the MPU 50 to the system input bus DTIN, and the buffer 303 outputs the memory address HADR to the data counter 34g.

The operation in the zero clear of the memory is as follows: The control signal HACK2* is activated by the zero clear signal ZCL* in the mediation circuit 400, and the content of the counter 301 becomes the memory address HADR through the buffer 303. The counter 301 which has been cleared to zero by the zero clear signal ZCL*, on completion of the operation of the zero clear signal ZCL*, counts up by a system clock PCKM2 outputted from a clock generator 304. The system clock PCKM2 is inputted to the clock generator 304, and the output of the system clock PCKM2 is controlled by the control signal HACK2* which is also inputted to the clock generator 304.

On counting up to a maximum of $FFFF_H$, the counter 301 outputs an end signal HSTOP from the ripple carry out terminal RCO. That is, the counter 301 sequentially outputs all of the addresses of the memory for the zero clear of the memory. At this time, the adder 203 of FIG. 17 in the data counter 34g continuously outputs "zero", as mentioned in Section (B-6). Thus all of the addresses in the memory 202 are rewritten to "zero" in accordance with the output of the counter 301, to clear the memory to zero. In this structure, the buffer 34d also serves as the memory zero clear 34f.

After the gradation level differences for all pixels are determined so that the matrix M representing the histogram of the frequencies is stored in the memory 202, the matrix M is read out to the MPU 50.

A control signal HACK3* brings 16-bit buffers 303 and 305 into operation. The content of the counter 301 is sent to the data counter 34g through the buffer 303 in the form of the memory address signal HADR. Triggered by a memory read signal MEMR*, the counter 301 counts up, so that the content of the memory 202 specified by the memory address signal HADR, that is, the elements (frequencies) of the matrix M are sequentially transmitted to the buffer 305. The content of the memory 202 or the matrix M is put on the system input bus DTIN via the buffer 305 and is received by the MPU 50.

Alternatively, the memory read/write buffer 34d may receive only the data of necessary addresses in accordance with a command from the MPU 50, if required. The MPU 50 supplies the address to be specified to the system output bus DTOT. When a counter write signal W301* becomes its active state, the load terminal LD of the counter 301 operates, so that the specified address on the output bus DTOT is loaded to the counter 301. The address is transmitted to the data counter 34g through the buffer 303 in the form of the memory address HADR.

A counter read signal R301* permits the memory address HADR to be monitored on the system input bus DTIN through the buffer 302.

(B-8) Mode Selector

The mode selector 34c selects either the production of the histogram of the gradation level differences or the production of the conventional reflectance histogram, to output the selection command in the form of the mode selection signal HMODE (in FIG. 15). As mentioned in Section (B-5), this preferred embodiment provides the structure in which the 8-bit latch 102 and 1-bit latch 104 of FIG. 16 are added to the circuit for producing the conventional reflectance histogram. The 1-bit latch 104 outputs the mode selection signal HMODE.

(B-9) Controller

Figure 20:
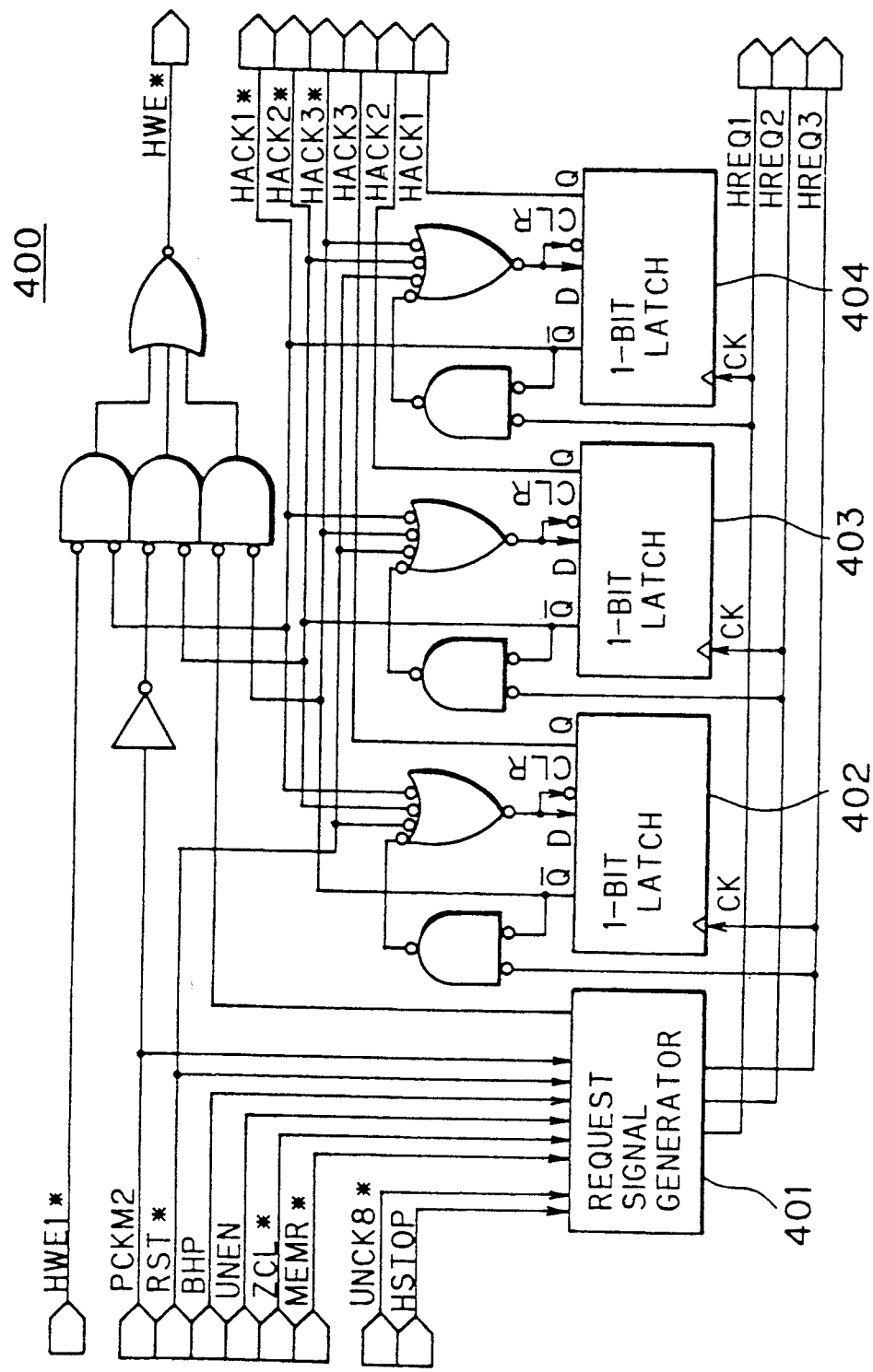
FIG. 20 is a circuit diagram of a mediation circuit.

FIG. 20 is a circuit diagram of the mediation circuit 400 which is the major part of the controller 34b. The mediation circuit 400 comprises a request signal generator 401 and three 1-bit latches 402, 403 and 404, which respectively mediate count requests, zero clear requests and access requests from the MPU 50. The mediations are carried out in the manner of exclusive control on a first-come, first-served basis. The mediation circuit 400 is initialized by the power source reset signal RST*.

When one of the access requests is generated in the receipt access requests state, the corresponding latch is inverted to immediately output an access enabling signal, and the other latches are forced to be reset so that an access request generated later is not received. This state is kept until the received access request is withdrawn. When withdrawn, the inverted latch is reset and the other latches are released from the reset to be enabled again. At this time, another access request, if already generated, is not permitted because the requests are received only at the positive edges of the request signal.

Description will be given on the operations of the above-mentioned components in the practical procedure of the calculations of the index values, in relation to the operation of the mediation circuit 400.

Prior to the reception of the pixel data (gradation level), the content of the memory 202 of FIG. 17 must be cleared to zero (the zero clear request).

Once the zero clear signal ZCL* is brought into operation in FIG. 20, the request signal generator 401 outputs a request signal HREQ2. The request signal HREQ2 is inputted to a clock terminal CK of the latch 403 whereby the control signal HACK2 (HACK2*) is outputted.

As described in Section (B-7), when the control signal HACK2* is activated, the zero clear signal ZCL* is inactivated and, subsequently, the counter 301 of FIG. 19 counts up. On counting up to the maximum, the counter 301 outputs the end signal HSTOP. The end signal HSTOP is inputted to the request signal generator 401 of FIG. 20, so that the zero clear request is withdrawn. During these operations, the adder 203 of FIG. 17 continuously outputs "zero" by the activated control signal HACK2*. It is apparent from FIG. 20 that the data of all addresses in the memory 202 are cleared to zero because the system clock PCKM2 and the memory write signal HWE* are in synchronism with each other.

The examination of the pixel data (gradation levels) and the production of the frequencies are as follows: When a count request signal UNEN is brought into operation in FIG. 20, the request signal generator 401 outputs a request signal HREQ1. The request signal HREQ1 is inputted to a clock terminal CK of the latch 404, so that the control signal HACK1 (HACK1*) is outputted. The logical product of the control signal HACK1* and the counter write signal HWE1* forms the memory write signal HWE*.

The memory write signal HWE* is inputted to the enabling terminal WE of the memory 202 in the data counter 34g of FIG. 17, to permit the rewrite of the memory 202. Since the control signal HACK1* brings the buffer 201 into operation, the data of the memory address HADR is rewritten.

The original image signal GS is examined in the above-mentioned manner. When the original image signal GS for one scanning line is examined (the process step S140 of FIG. 7), the black hold pulse BHP is inputted to the request signal generator 401, whereby the count request is once withdrawn. When the count request signal UNEN is again inputted, the scanning of the next scanning line starts (the process step S150).

On completion of the scanning of all pixels and the generation of the frequencies, the frequencies which are the elements of the matrix M are transmitted to the MPU 50 to be used for determination of the optimum threshold level through the adaptive thresholding method (the process steps S160 to S190 of FIG. 8). The access request signal MEMR* from the MPU 50 is inputted to the request signal generator 401 so that a request signal HREQ3 is provided. The request signal HREQ3 is inputted to a clock terminal CK of the latch 402, so that the control signal HACK3 (HACK3*) is outputted. The control signal HACK3* brings the buffer 305 of FIG. 19 into operation, whereby the content of the matrix M is put on the system input bus DTIN to be sent to the MPU 50.

As above mentioned, the threshold level setting circuit 34 shown in FIG. 15 executes the process steps S100 to S150 of FIG. 7 by the linked operations of the respective components thereof. The process steps S160 to S190 are executed by the MPU 50 in the software, however, may be executed in the hardware having adders and the like.

C. Another Application

Section B describes the application of the present invention as a pattern inspection device for printed circuit boards. The present invention, however, may be applied to devices other than the pattern inspection devices for printed circuit boards.

Figure 21:
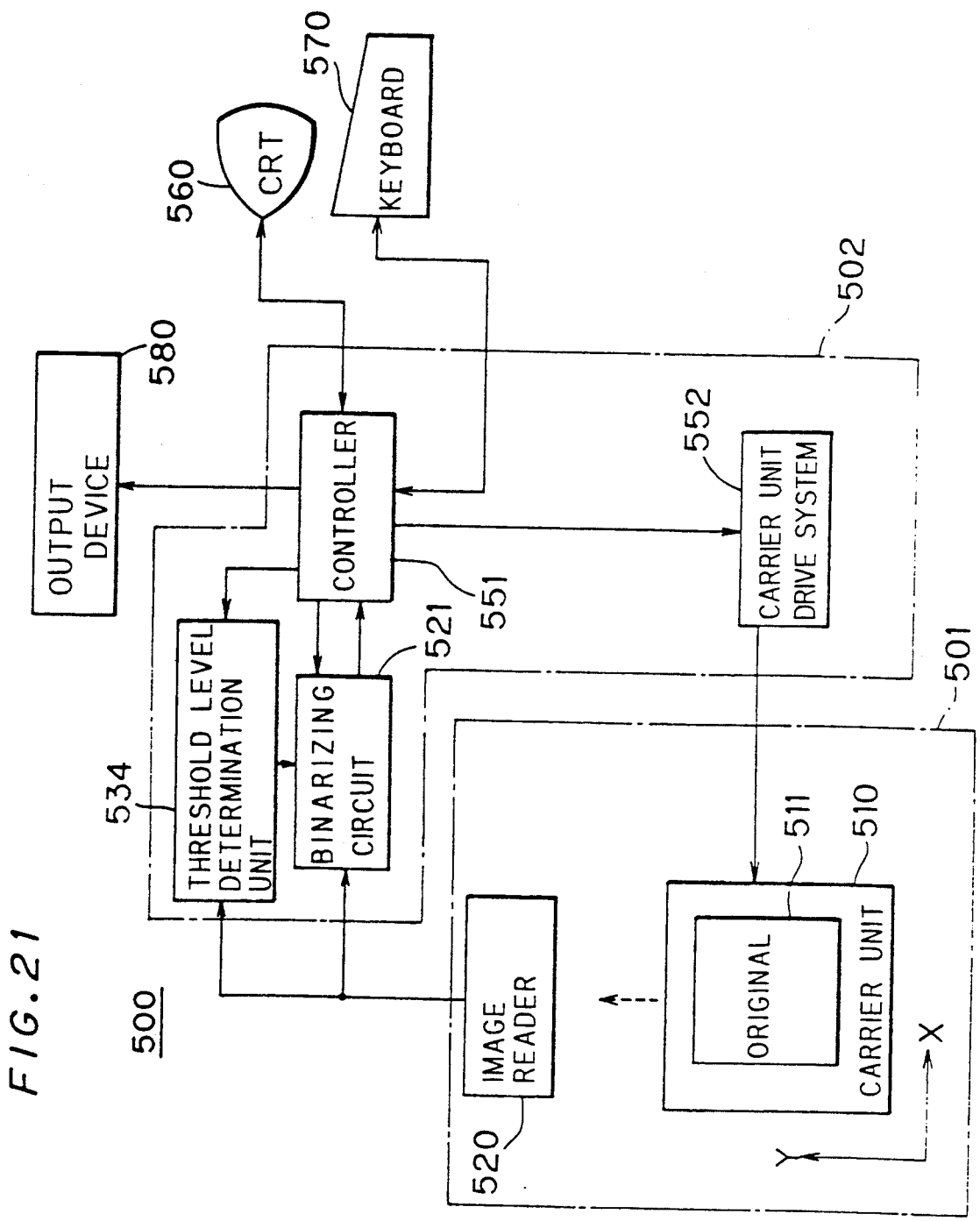
FIG. 21 is a block diagram of a device for reading large drawing.

FIG. 21 is a block diagram of a large-drawing reading device 500 which includes a threshold level determination unit 534 for determining a binarization threshold level according to the present invention. The large-drawing reading device 500 reads the image of drawing lines drawn on a large sheet of paper and produces for each pixel a binary digital signal indicative of white or black, to send the signal to external CAD systems or processors.

Figure 22:
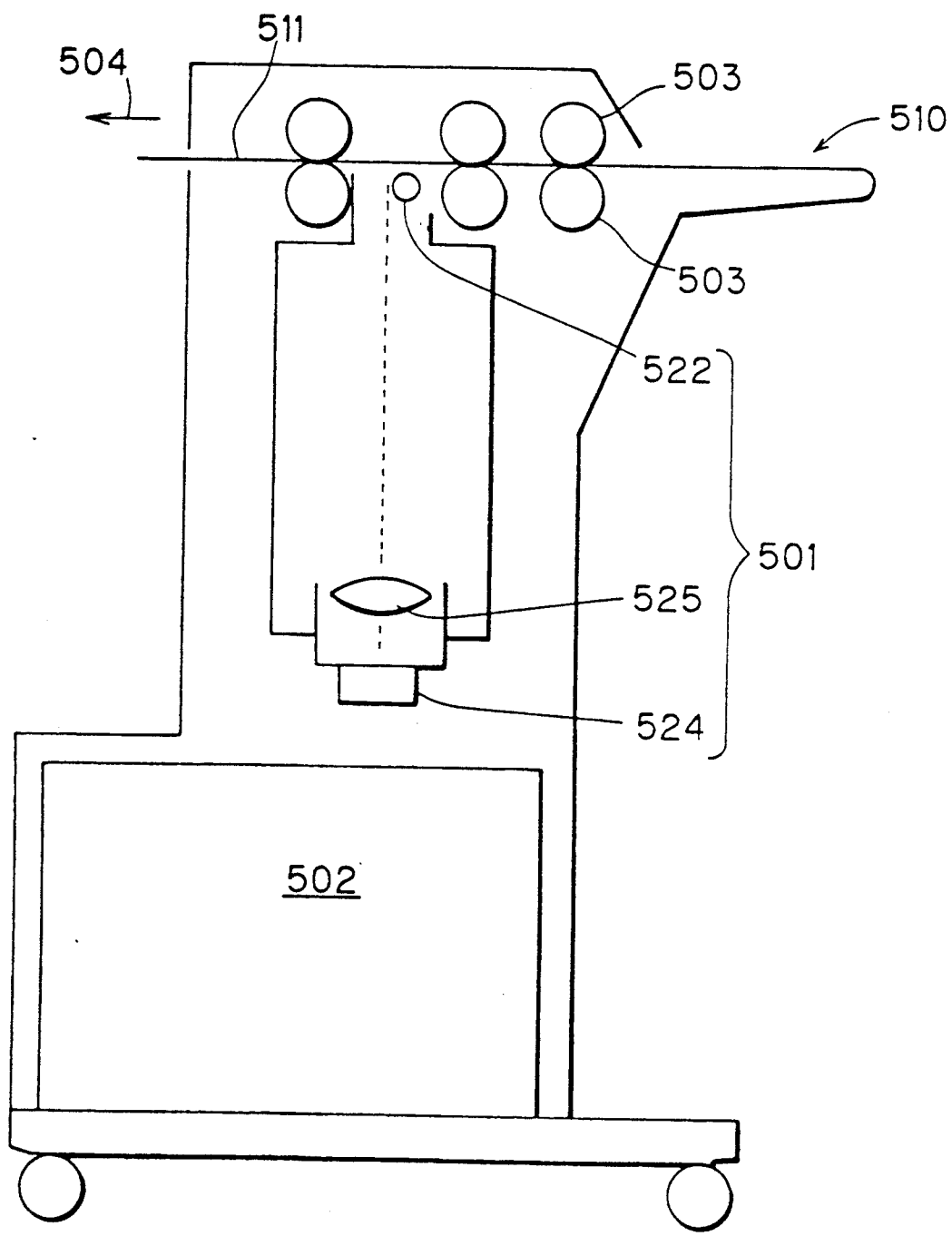
FIG. 22 is a cross-sectional view of the device of FIG. 21.

FIG. 22 shows in cross section a structure of the large-drawing reading device 500 which comprises a read unit 501 and a signal processing unit 502. A diazo printed large-drawing which is an original 511 is fed in the direction of the arrow 504 by feed rollers 503 which constitute a carrier unit 510. While the original 511 is fed, the image of the original 511 is sequentially read by an image reader 520 which includes a light source 522, a CCD 524 and a lens 525. The content of the image which is read is transmitted to a binarizing circuit 521 and the threshold level determination unit 534 which are included in the signal processing unit 502.

The threshold level determination unit 534 determines the binarization threshold levels in the same manner as described in Section B, and the information thereof is transmitted to the binarizing circuit 521. The binarizing circuit 521 binarizes the original image with the threshold value to send the binarized result to a controller 551. The controller 551 transmits the binary image to an output device 580. The controller 551 controls not only the threshold determination unit 534 and binarizing circuit 521 but also a carrier unit drive system 552 which drives the carrier unit 510.

The output device 580 outputs the binary image. When the original 511 is the diazo printed drawing, the outputted binary image is a drawing having a clear contrast between white and black. These operations are manipulated and confirmed by a CRT 560 and a keyboard 570 which are connected to the controller 551.

As above described, the present invention is applicable to all devices which perform image processings including image-binarization, such as image scanners and facsimiles.

While the invention has been shown and described in detail, the foregoing description is in all aspects illustrative and not restrictive. It is therefore to be understood that numerous modifications and variations can be devised without departing from the scope of the invention.

We claim:

1. A method of obtaining a binary image from an original image in which respective density levels of pixels are represented in the form of gradation levels, comprising the steps of:
   (a) obtaining pairs of gradation levels representing respective pairs of adjacent pixels in said original image;
   (b) counting the number of said pairs of gradation levels which are equal to one another, each count produced by said counting corresponding to a unique pair of values;
   (c) determining a tentative threshold level;
   (d) obtaining the number of pairs of adjacent pixels each of which is comprised of such two gradation levels that said tentative threshold level is included in a range defined by said two gradation levels, to obtain an index value;
   (e) repeating the steps (c) and (d) while updating said tentative threshold value among a plurality of tentative threshold values, to obtain a plurality of index values;
   (f) comparing said plurality of index values with each other to determine a threshold value; and
   (g) comparing said respective gradation levels of pixels in said original image with said threshold value to obtain a binarized image.

2. The method of claim 1, wherein the step (d) comprises the steps of:
   (d-1) selecting such a first pair of gradation levels that said tentative threshold level is included in a first range defined by said first pair of gradation levels;
   (d-2) selecting such a second pair of gradation levels that said tentative threshold level is included in a second range defined between said second pair of gradation levels; and
   (d-3) summing up first and second numbers of pairs of adjacent pixels having said first and second pair of gradation levels, respectively, to obtain said index value.

3. The method of claim 2, wherein the step (b) comprises the steps of:
   (b-1) preparing a memory having a plurality of storage areas which are assigned to respective pairs of gradation levels; and
   (b-2) storing the number of said pairs of gradation levels for each pair values in a corresponding storage area of said memory.

4. The method of claim 3, wherein the step (b-2) comprises the step of:
   (b-2-1) obtaining a histogram of said pairs of gradation levels in said plurality of storage areas.

5. The method of claim 4, wherein
   the number of said plurality of tentative threshold values are substantially equal to the total number of gradation levels for representing said original image.

6. The method of claim 5, wherein the step (f) comprises the steps of:
   (f-1) obtaining a minimum of said plurality of index values; and
   (f-2) selecting one tentative threshold value corresponding to said minimum among said plurality of tentative threshold values to determine said threshold value.

7. The apparatus of claim 5, wherein the means (f) comprises:
   (f-1) means for obtaining a minimum of said plurality of index values; and
   (f-2) means for selecting one tentative threshold value corresponding to said minimum among said plurality of tentative threshold values to determine said threshold value.

8. An apparatus for obtaining a binary image from an original image in which respective density levels of pixels are represented in the form of gradation levels, comprising:
   (a) means for obtaining pairs of gradation levels representing respective pairs of adjacent pixels in said original image;
   (b) means for counting the number of said pairs of gradation levels which are equal to one another, each count produced by said counting corresponding to a unique pair of values;
   (c) means for providing a tentative threshold level;
   (d) means for obtaining the number of pairs of adjacent pixels each of which is comprised of such two gradation levels that said tentative threshold level is included in a range defined by said two gradation levels, to obtain an index value;
   (e) means for repeating respective operations of the means (c) and (d) while updating said tentative threshold value among a plurality of tentative threshold values, to obtain a plurality of index values;
   (f) means for comparing said plurality of index values with each other to determine a threshold value; and
   (g) means for comparing said respective gradation levels of pixels in said original image with said threshold value to obtain a binarized image.

9. The apparatus of claim 8, wherein the means (b-2) comprises:
   (d-1) means for selecting such a first pair of gradation levels that said tentative threshold level is included in a first range defined by said first pair of gradation levels;

(d-2) means for selecting such a second pair of gradation levels that said tentative threshold level is included in a second range defined between said second pair of gradation levels; and (d-3) means for summing up first and second numbers of pairs of adjacent pixels having said first and second pair of gradation levels, respectively, to obtain said index value.

10. The apparatus of claim 9, wherein the means (b) comprises:

(b-1) memory means having a plurality of storage areas which are assigned to respective pairs of gradation levels; and (b-2) means for storing the number of said pairs of gradation levels for each pair values in a corresponding storage area of said memory means.

11. The apparatus of claim 10, wherein the means (b-2) comprises:

(b-2-1) means for obtaining a histogram of said pairs of gradation levels in said plurality of storage areas.

12. The apparatus of claim 11, wherein the number of said plurality of tentative threshold values are substantially equal to the total number of gradation levels for representing said original image.

13. A method of inspecting a pattern on a printed circuit board, comprising the steps of:

(a) photoelectrically reading an image of said pattern to obtain an original image representing said pattern, in which representative density levels of pixels are represented in the form of gradation levels;

(b) obtaining pairs of gradation levels representing respective pairs of adjacent pixels in said original image;

(c) counting the number of said pairs of gradation levels which are equal to one another, each count produced by said counting corresponding to a unique pair of values;

(d) determining a tentative threshold level;

(e) obtaining the number of pairs of adjacent pixels each of which is comprised of such two gradation levels.that said tentative threshold level is included in a range defined by said two gradation levels, to obtain an index value;

(f) repeating the steps (d) and (e) while updating said tentative threshold value among a plurality of tentative threshold values, to obtain a plurality of index values;

(g) comparing said plurality of index values with each other to determine a threshold value;

(h) comparing said respective density levels of pixels in said original image with said threshold value to obtain a binarized image; and (i) inspecting said pattern on the basis of said binary image.

14. An apparatus of inspecting a pattern on a printed circuit board, comprising:

(a) means for photoelectrically reading an image of said pattern to obtain an original image representing said pattern, in which respective density levels of pixels are represented in the form of gradation levels;

(b) means for obtaining pairs of gradation levels representing respective pairs of adjacent pixels in said original image;

(c) means for counting the number of said pairs of gradation levels which are equal to one another, each count produced by said counting corresponding to a unique pair of values;

(d) means for determining a tentative threshold level;

(e) means for obtaining the number of pairs of adjacent pixels each of which is comprised of such two gradation levels that said tentative threshold level is included in a range defined by said two gradation levels, to obtain an index value;

(f) means for repeating respective operations of the means (d) and (e) while updating said tentative threshold value among a plurality of tentative threshold values, to obtain a plurality of index values;

(g) means for comparing said plurality of index values with each other to determine a threshold value;

(h) means for comparing said respective gradation levels of pixels in said original image with said threshold value to obtain a binarized image; and (g) means for inspecting said pattern on the basis of said binary image.

15. A method of converting an image of a drawing on which lines are drawn into a binary image, comprising the steps of:

(a) photoelectrically reading an image of said drawing to obtain an original image representing said lines, in which respective density levels of pixels are represented in the form of gradation levels;

(b) obtaining pairs of gradation levels representing respective pairs of adjacent pixels in said original image;

(c) counting the number of said pairs of gradation levels which are equal to one another, each count produced by said counting corresponding to a unique pair of values;

(d) determining a tentative threshold level;

(e) obtaining the number of pairs of adjacent pixels each of which is comprised of such two gradation levels that said tentative threshold level is included in a range defined by said two gradation levels, to obtain an index value;

(f) repeating the steps (d) and (e) while updating said tentative threshold value among a plurality of tentative threshold values, to obtain a plurality of index values;

(g) comparing said plurality of index values with each other to determine a threshold value;

(h) comparing said respective gradation levels of pixels in said original image with said threshold value to obtain a binarized image; and (g) outputting said binary image.

16. An apparatus for converting an image of a drawing on which lines are drawn into a binary image, comprising:

(a) means for photoelectrically reading an image of said drawing to obtain an original image representing said lines, in which respective density levels of pixels are represented in the form of gradation levels;

(b) means for obtaining pairs of gradation levels representing respective pairs of adjacent pixels in said original image;

(c) means for counting the number of said pairs of gradation levels which are equal to one another, each count produced by said counting corresponding to a unique pair of values;

(d) means for determining a tentative threshold level;

(e) means for obtaining the number of pairs of adjacent pixels each of which is comprised of such two gradation levels that said tentative threshold level is included in a range defined by said two gradation levels, to obtain an index value;

(f) means for repeating respective operations of the means (d) and (e) while updating said tentative threshold value among a plurality of tentative threshold values, to obtain a plurality of index values;

(g) means for comparing said plurality of index values with each other to determine a threshold value;

(h) means for comparing said respective gradation levels of pixels in said original image with said threshold value to obtain a binarized image; and (g) means for outputting said binary image.

* * * * *